(12) United States Patent
Kurihara et al.

(10) Patent No.: US 10,040,376 B2
(45) Date of Patent: Aug. 7, 2018

(54) SEAT FRAME

(71) Applicants: TS TECH CO., LTD., Asaka-shi, Saitama (JP); HONDA MOTOR CO., LTD., Tokyo (JP); IMASEN ELECTRIC INDUSTRIAL CO., LTD., Aichi (JP)

(72) Inventors: Akimitsu Kurihara, Tochigi (JP); Yuta Kijima, Tochigi (JP); Tomoki Matsumoto, Saitama (JP); Takashi Yasuda, Saitama (JP); Atsushi Sakakibara, Aichi (JP)

(73) Assignees: TS Tech Co., Ltd., Saitama (JP); Honda Motor Co., Ltd., Tokyo (JP); Imasen Electric Industrial Co., Ltd., Aichi (JP)

( * ) Notice: Subject to any disclaimer, the term of this patent is extended or adjusted under 35 U.S.C. 154(b) by 7 days.

(21) Appl. No.: 15/281,883

(22) Filed: Sep. 30, 2016

(65) Prior Publication Data
US 2017/0096082 A1 Apr. 6, 2017

(30) Foreign Application Priority Data
Oct. 2, 2015 (JP) ................. 2015-197192

(51) Int. Cl.
*B60N 2/16* (2006.01)
*B60N 2/68* (2006.01)

(52) U.S. Cl.
CPC ........... *B60N 2/1615* (2013.01); *B60N 2/165* (2013.01); *B60N 2/68* (2013.01)

(58) Field of Classification Search
CPC .......... B60N 2/1615; B60N 2/165; B60N 2/68
See application file for complete search history.

(56) References Cited

U.S. PATENT DOCUMENTS

| | | | |
|---|---|---|---|
| 7,651,164 B2 * | 1/2010 | Garnier et al. ...... | B60N 2/2257 192/19 |
| 8,414,055 B2 * | 4/2013 | Kanda .................. | B60N 2/1615 296/65.09 |
| 2002/0079730 A1 * | 6/2002 | Schuhmacher ........ | B60N 2/015 297/378.1 |
| 2014/0339874 A1 * | 11/2014 | Behrens ............... | B60N 2/1615 297/344.15 |

FOREIGN PATENT DOCUMENTS

JP 2015-150915 A 8/2015

* cited by examiner

*Primary Examiner* — Philip F Gabler
(74) *Attorney, Agent, or Firm* — Drinker Biddle & Reath LLP

(57) ABSTRACT

A seat frame for a vehicle seat includes a seat cushion frame that forms a frame for a seating portion of the vehicle seat, and a height adjustment mechanism that is coupled to the seat cushion frame and a rail mechanism of the vehicle seat. The height adjustment mechanism adjusts the height of the seat cushion frame. The height adjustment mechanism includes a sector gear that rotates based on a height adjustment operation, a link that moves the height of the seat cushion frame up and down based on the rotation of the sector gear, and a restriction member that abuts against the sector gear, thereby restricting the movement of the sector gear. At least one of portions of the sector gear and the restriction member that abut against each other has a tapered shape.

9 Claims, 25 Drawing Sheets

SEAT FRAME

CROSS REFERENCE TO RELATED APPLICATIONS

This application is based upon and claims the priority benefit of Japanese Patent Application No. JP2015-197192, filed Oct. 2, 2015, the contents being incorporated herein by reference.

BACKGROUND

The present disclosure relates to a seat frame, and more particularly to a seat frame for a vehicle seat including a height adjustment mechanism.

Some vehicle seats include a height adjustment mechanism that adjusts the height of a seat cushion, which is a seating portion. Some height adjustment mechanisms are configured to use a link mechanism driven by a sector gear meshing with a pinion gear rotating in accordance with a height adjustment operation, thereby adjusting the height of the vehicle seat (for example, refer to Japanese Patent Application Laid-Open No. 2015-150915). Moreover, the movement of the sector gear is restricted by inserting a pin through a through hole formed on the sector gear, and causing the pin and the sector gear to abut against each other in the height adjustment mechanism.

However, when the sector gear is rotated by a manual height adjustment operation, a torsional force acts on the sector gear, and a noise is generated at an abutment position between the sector gear and the pin.

SUMMARY

The present disclosure has been made in view of the above-described problem, and an embodiment of the present disclosure provides a seat frame capable of suppressing the generation of the noise when the sector gear rotates based on the height adjustment operation.

The above-described problem is solved by an embodiment of a seat frame for a vehicle seat including a seat cushion frame that forms a frame for a seating portion of the vehicle seat, and a height adjustment mechanism that is coupled to the seat cushion frame and a rail mechanism of the vehicle seat. The height adjustment mechanism adjusts the height of the seat cushion frame. The height adjustment mechanism includes a sector gear that rotates based on a height adjustment operation, a link that moves the height of the seat cushion frame up and down based on the rotation of the sector gear, and a restriction member that abuts against the sector gear, and restricts the movement of the sector gear, and at least one of portions of the sector gear and the restriction member that abut against each other has a tapered shape.

With the above-described seat frame, when the sector gear rotates based on the height adjustment operation, the generation of the noise can be suppressed by providing a beveled surface at the portions at which the sector gear and the restriction mechanism abut against each other.

In the seat frame, the restriction member may be a pin, which is a cylinder inserted through a through hole in the sector gear. With this configuration, workability increases when the restriction member is attached to the seat frame. Moreover, the movement of the sector gear can be restricted by an abutment between a wall portion of the through hole in the sector gear and the restriction member.

In the seat frame, the restriction member may have a tapered region in a tapered shape, and a straight region constant in a cross sectional shape. With this configuration, only a necessary part is formed into the tapered shape on the restriction member. Thus, production of the restriction member is facilitated.

In the seat frame, the restriction member may include a tip portion that engages with the seat cushion frame, and a main body portion that includes a portion abutting against the sector gear, and the tip portion and the main body portion may be connected with each other via a step structure. With this configuration, the portion engaging with the seat cushion frame and the portion abutting against the sector gear can be different in the diameter. As a result, the diameters of the tip portion and the main body portion can respectively be formed into the shapes corresponding to the portions with which they will be engaged.

In the seat frame, the main body portion may include the tapered region and the straight region, and the straight region may be provided between the tapered region and the tip portion. With this configuration, the diameter of a portion connecting to the step structure can be increased. As a result, the rigidity of the restriction member can be secured.

In the seat frame, a thread may be formed on the tip portion, and the tapered region may be larger in the diameter than the tip portion. With this configuration, workability can be increased when the restriction member is attached. Moreover, rigidity of a portion of the restriction member abutting against the sector gear can be secured.

According to an embodiment of the present disclosure, the generation of the noise can be suppressed when the sector gear rotates based on the height adjustment operation.

According to an embodiment of the present disclosure, the workability can be increased when the restriction member is attached to the seat frame.

According to an embodiment of the present disclosure, the production of the restriction member can be facilitated.

According to an embodiment of the present disclosure, the diameters of the tip portion and the main body portion can respectively be formed into shapes corresponding to the portions with which they will be engaged.

According to an embodiment of the present disclosure, the rigidity of the restriction member can be secured.

According to an embodiment of the present disclosure, the rigidity of the portion of the restriction member abutting against the sector gear can be secured.

BRIEF DESCRIPTION OF THE DRAWINGS

Various embodiments of the invention are illustrated in the drawings, in which.

DETAILED DESCRIPTION

Embodiments of the present disclosure relate to a seat frame for a vehicle seat including a seat cushion frame that serves as a frame of a seating portion of the vehicle seat, a seatback frame that serves as a frame of a backrest of the vehicle seat, and a hip support member that is coupled to a bottom frame included in the seatback frame. The hip support member includes a coupling region that extends in a seat widthwise direction, and is coupled to the bottom frame. The hip support member also includes a hip support region that extends from the coupling region toward the seat cushion frame, and supports the hip of a passenger. The hip support region is longer in the seat widthwise direction than the coupling region. It should be noted that the description of the present disclosure is provided for various embodiments of a seat frame that is applied to a seat frame for a vehicle (hereinafter referred to as vehicle seat frame).

A description is now given of the vehicle seat and the vehicle seat frame serving as the frame for the vehicle seat according to various embodiments of the present disclosure with reference to FIG. 1 to FIG. 16.

In the following description, a "front to back direction" means a front to back direction viewed from a seated person on the vehicle seat, and is a direction coincident with a travel direction of the vehicle. A "seat widthwise direction" means a widthwise direction of the vehicle seat and coincides with a right and left direction viewed from the seated person on the vehicle seat. Moreover, a "height direction" means a height direction of the vehicle seat, and coincides with an up and down direction when the vehicle seat is viewed from the front side.

Construction of Vehicle Seat S

Figure 1:
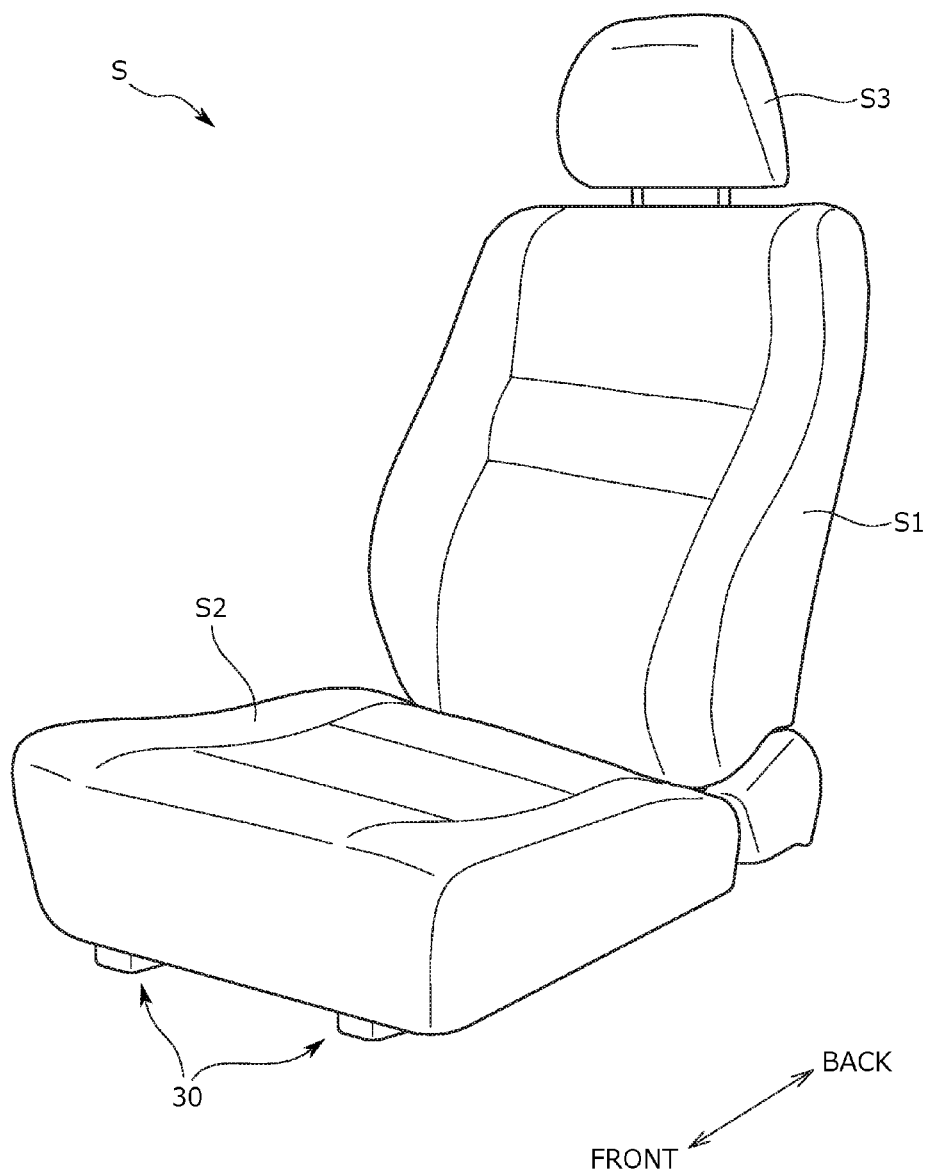
FIG. 1 is a perspective view of a vehicle seat.

First, a description is given of an example construction of a vehicle seat S according to a first embodiment of the present disclosure. The vehicle seat S includes a seatback S1, a seat cushion S2, and a headrest S3 as shown in FIG. 1. Moreover, a slide rail mechanism 30 for moving, by sliding, a seat main body (principal portion of the vehicle seat S) in the front to back direction is provided at a bottom portion of the seat cushion S2.

Figure 2:
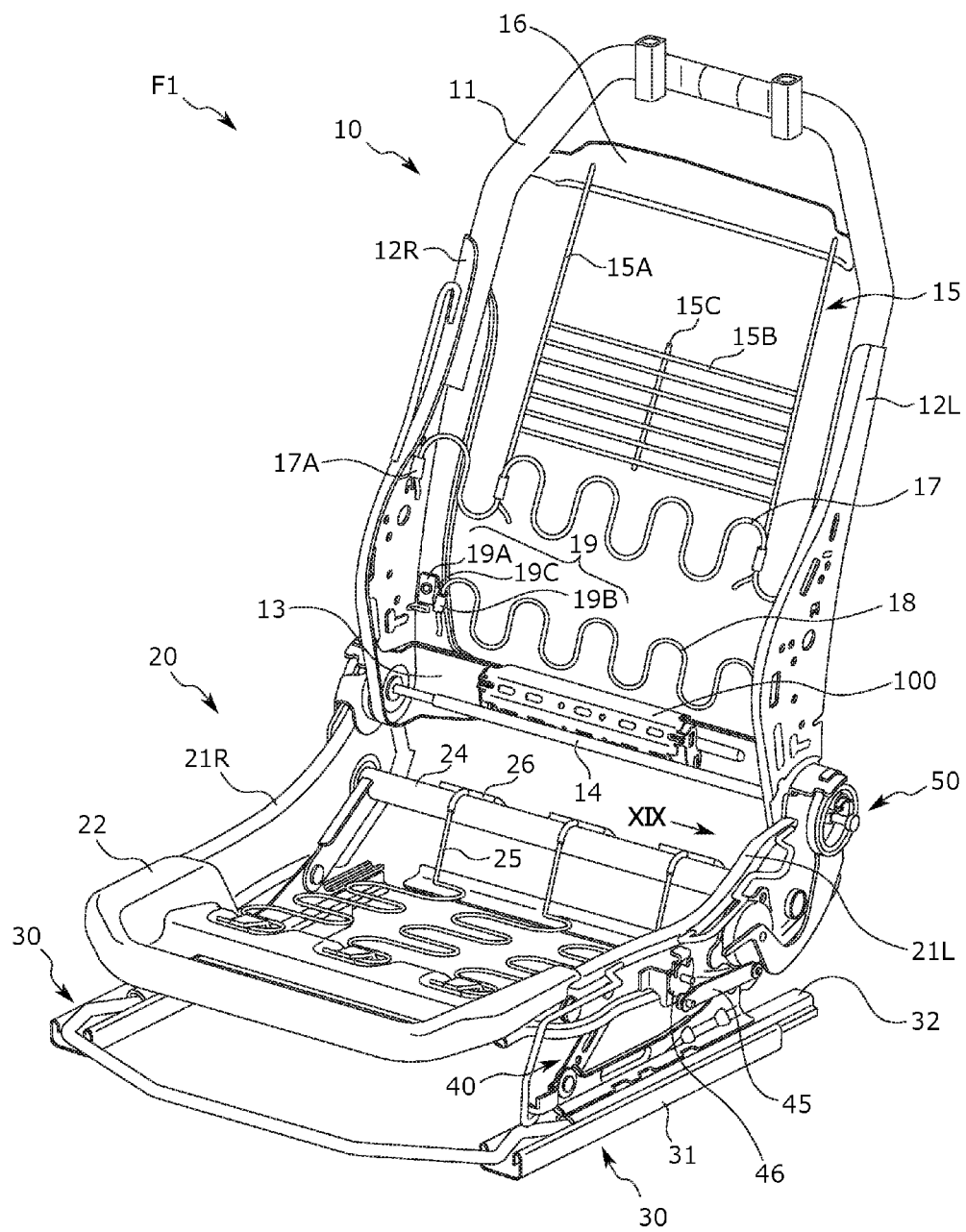
FIG. 2 is a perspective view of a vehicle seat frame according to a first embodiment.
Figure 3:
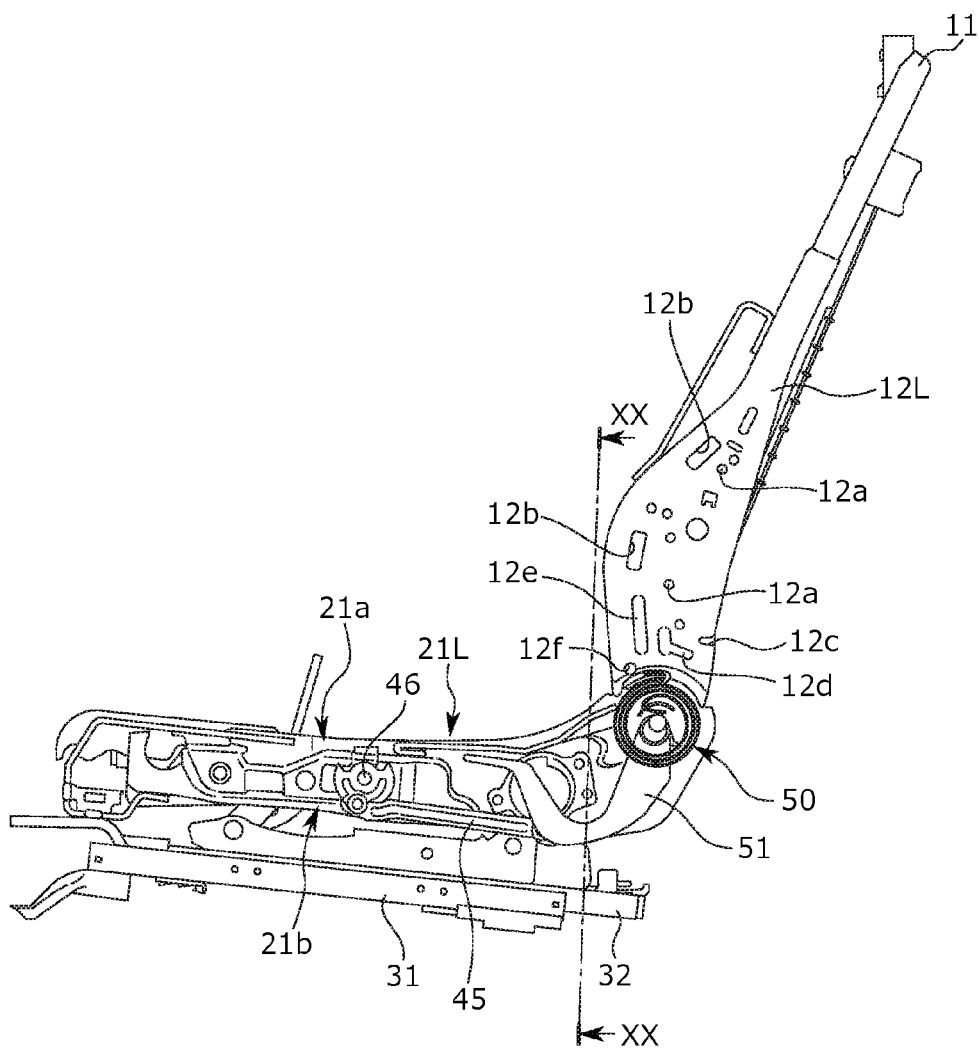
FIG. 3 is a left side view of the vehicle seat frame according to the first embodiment.
Figure 4:
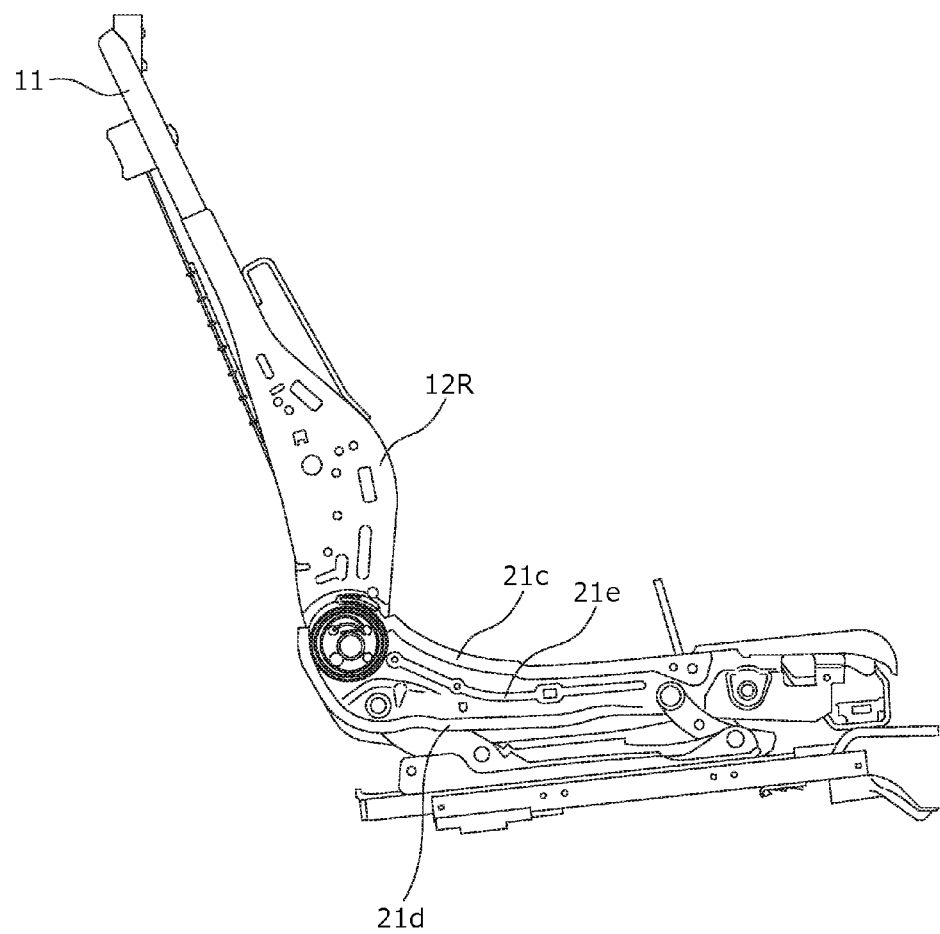
FIG. 4 is a right side view of the vehicle seat frame according to the first embodiment.

The vehicle seat S includes a vehicle seat frame F1 shown in FIG. 2 as a frame thereof. Moreover, a left side view of the vehicle seat frame F1 is shown in FIG. 3, and a right side view of the vehicle seat frame F1 is shown in FIG. 4. A description is now given of a construction of the vehicle seat frame F1 referring to FIG. 2 to FIG. 4.

Construction of Vehicle Seat Frame F1

As shown in FIG. 2, the vehicle seat frame F1 includes a seatback frame 10 and a seat cushion frame 20 as principal components.

The seatback frame 10 includes a top frame 11 in an inverted U shape, a seatback side frame 12L forming a left end in the seat widthwise direction, a seatback side frame 12R forming a right end in the seat widthwise direction, and a bottom frame 13 bridging between the seatback side frame 12L and the seatback side frame 12R. Moreover, a reclining shaft 14 of a reclining mechanism 50 is set between bottom ends of the seatback side frame 12L and the seatback side frame 12R to pass through the seatback side frame 12L and the seatback side frame 12R. An angle of the seatback frame 10 can be adjusted by operating a reclining operation portion 51, thereby operating the reclining mechanism 50.

An S spring 17 and an S spring 18 serving as pressure reception members are respectively suspended between center portions and between bottom portions of the seatback side frame 12L and the seatback side frame 12R. Right and left ends of the S spring 18 on the lower side are locked to hook portions 19B of S spring hook brackets 19 provided respectively for the seatback side frames 12L and 12R. It should be noted that the S spring hook bracket 19 is fixed to the seatback side frame by using a fixation portion 19A, and a bead is formed from the fixation portion 19A to the hook portion 19B, thereby increasing rigidity of the S spring hook bracket. Moreover, right and left ends of the S spring 17 on the center side are locked to lock portions 17A respectively provided for the seatback side frames 12L and 12R.

Moreover, a pressure reception member 15 that supports the back of the seated person on the vehicle seat S from a backward side is provided between the seatback side frame 12L and the seatback side frame 12R. This pressure reception member 15 is constructed by a seat-form spring (e.g., Pullmaflex), and is maintained in a suspended state via wires or the like from an upper cross member 16 that couples both ends of the top end frame 11 to each other. Specifically, the pressure reception member 15 is constructed by a pair of right and left side wires 15A, multiple cross wires 15B stretched between the side wires 15A, and a center wire 15C arranged at a center portion of the cross wires 15B in parallel with the side wires 15A. In this embodiment, top ends of the side wires 15A are attached to the upper cross member 16, and bottom ends of the side wires 15A are attached to the S spring 17 for holding.

As described above, a pressure reception characteristic of the S spring 17 can be utilized in a wide range including the pressure reception member 15 while the number of components is reduced by coupling the pressure reception member 15 to the S spring 17.

Moreover, a hip support member 100 that supports the hip of the passenger seating on the vehicle seat S is attached to a center portion of the bottom frame 13 as shown in FIG. 2. This hip support member 100 provides a function of suppressing a movement of the hip of the passenger backward upon a rear end collision to promote a backward inclination of the upper body of the passenger, thereby causing the upper body of the passenger to sink in the vehicle seat S so that an impact on the cervical portion is effectively absorbed. It should be noted that a detailed description is given below of the shape of the hip support member 100 and a construction of the coupling to the bottom frame 13.

A description is now given of the seat cushion frame 20 serving as the frame of the seating portion of the vehicle seat S. The seat cushion frame 20 has an external shape of a square frame shape as viewed from the upward side as shown in FIG. 2. The seat cushion frame 20 includes a cushion side frame 21L that is positioned at a left end in the seat widthwise direction, a cushion side frame 21R that is positioned at a right end in the seat widthwise direction, and a pan frame 22 that forms a front end of the seat cushion frame 20 as principal components. Moreover, an upward portion of a rear end of the cushion side frame 21L is attached to a bottom end of the seatback side frame 12L via a coupling bracket.

Moreover, downward portions of the rear end of the cushion side frame 21L and the cushion side frame 21R are coupled to each other by a member that extends outward in the seat widthwise direction as shown in FIG. 2. This member is a coupling pipe 24 as a hollow member, and is constructed specifically by a round pipe. Moreover, both ends in the seat widthwise direction of the coupling pipe 24 are supported by the cushion side frame 21L and the cushion side frame 21R via end sleeves as tubular members.

Moreover, multiple S springs 25 are provided as buttock support members to be arranged in the seat widthwise direction between the cushion side frame 21L and the cushion side frame 21R. The S springs 25 are provided to support the buttock of a passenger, who is a seated person, and extend over a long length in the front to back direction. Moreover, a front end of the S spring 25 is fixed to a top end surface of the pan frame 22. Moreover, a rear end of the S spring 25 is hooked to the coupling pipe 24 by using an engagement hook 26 arranged between the cushion side frame 21L and the cushion side frame 21R.

Moreover, the vehicle seat S includes a height adjustment mechanism 40 for adjusting the height of the seat cushion S2. The height adjustment mechanism 40 is arranged in the up and down direction between the seat cushion frame 20 and an upper rail 32 of the slide rail mechanism 30. It should be noted that the slide rail mechanism 30 is constructed to include lower rails 31 and the upper rails 32. A slide of the upper rails 32 to which the seat cushion frame 20 is coupled with respect to the lower rails 31 enables a movement of the vehicle seat frame F1 in the front to back direction. Then, when the passenger operates a height adjustment operation portion 46, the height of the seat main body including the seat cushion S2 is adjusted by the height adjustment mechanism 40.

A description is now given of a side surface shape on the left side of the vehicle seat frame F1 based on FIG. 3. A side surface of the seatback side frame 12L is constructed to have a shape increasing in a width from a coupling position to the top frame 11 toward a coupling position to the seat cushion frame 20 as shown in FIG. 3. Then, multiple holes including airbag attachment holes 12a and webbing clip attachment holes 12b are formed on the side surface of the seatback side frame 12L.

An airbag module is fastened to the airbag attachment holes 12a by using bolts. Moreover, clips are attached to two downward positions on one side in the seat widthwise direction of a webbing (not shown) upon an attachment thereof. The webbing is fixed to the seatback frame 10 by attaching these two clips attached to the webbing respectively to the webbing clip attachment holes 12b at the two positions on the seatback side frame 12L. In this embodiment, a close arrangement between the airbag attachment holes 12a and the webbing clip attachment holes 12b enables an efficient deployment of the airbag in the webbing. As a result, the airbag is configured to quickly deploy in a direction guided by the webbing.

Moreover, multiple weak portions are formed in a periphery of a downward end of the seatback side frame 12L. In this embodiment, the weak portion is a position having reduced strength to induce a deformation of the frame, and is constructed as a bead shape recessed from an outer peripheral surface of the seatback side frame 12L to a seat inside, or a hole formed in the frame according to this embodiment. The seatback side frame is deformed at the positions of the weak portions upon a backend collision, thereby efficiently absorbing impact by providing the weak portions in the seatback side frame.

As shown in FIG. 3, a bead portion 12c extending from the side surface of the seatback side frame 12L (12R) to a rear surface in the seat widthwise direction, and recessed toward the seat inside direction functions as the weak portion. Moreover, a hole provided on a seat upward side with respect to the bead portion on the rear surface of the seatback side frame 12L (12R) also functions as the weak portion. Moreover, a hole 12f provided on a periphery of the seat downward end on the side surface of the seatback side frame 12L (12R) also functions as the weak portion.

It should be noted that the S spring hook bracket 19 is provided upward with respect to a bead portion 12c functioning as the weak portion, and a deformation thus tends to occur at the position of the bead portion 12c functioning as the weak portion when a load of the passenger is applied to the S spring hook bracket 19 upon the rear end collision. As a result, an impact absorption property can be increased.

On the other hand, reinforcement portions for increasing strength are formed on the seatback side frame 12L (12R), and strength of required portions is improved. For example, a bead portion 12d in an approximately L shape provided on the side surface of the seatback side frame 12L (12R) functions as the reinforcement portion. Moreover, a bead portion 12e in an approximately I shape provided on a seat forward side with respect to the bead portion 12d also functions as the reinforcement portion on the side surface of the seatback side frame 12L (12R).

Moreover, bead portions 21a and 21b (regions each having a shape protruding toward the seat outside) extending from a center portion to a front portion are provided respectively on an upward end and a downward end on the side surface of the cushion side frame 21L as shown in FIG. 3. The height adjustment operation portion 46 of the height adjustment mechanism 40 is arranged between the upper bead portion 21a and the lower bead portion 21b. The vehicle seat S can be constructed in a compact manner by efficiently using the space between the upper bead portion 21a and the lower bead portion 21b in this way.

A description is now given of a side surface shape on the right side of the vehicle seat frame F1 based on FIG. 4. The side surface of the seatback side frame 12R is the same as the side surface of the seatback side frame 12L as shown in FIG. 4, a description thereof is therefore omitted, and a description is now given of a side surface shape of the cushion side frame 21R.

Bead portions 21c and 21d extending from a center portion to a backward portion are provided respectively on an upward end and a downward end on the side surface of the cushion side frame 21R as shown in FIG. 4. A spacing interval between the upper bead portion 21c and the lower bead portion 21d is configured to gradually increase from the seat forward side to the seat backward side, and a bead portion 21e having a shape that connects three holes with each other is provided between the upper bead portion 21c and the lower bead portion 21d. The three holes provided in the bead portion 21e are useable for member attachment. The rigidity of the member attachment portions can be increased on the cushion side frame 21R by forming the holes for the member attachment in the bead portion 21e.

Construction of Hip Support Member 100

A detailed description is now given of the construction of the hip support member 100 provided for the vehicle seat frame F1 according to this embodiment with reference to FIG. 5 to FIG. 11. A direction of each portion of the hip support member 100 is described hereinafter to correspond to a direction when the hip support member 100 is attached to the bottom frame 13.

Figure 5:
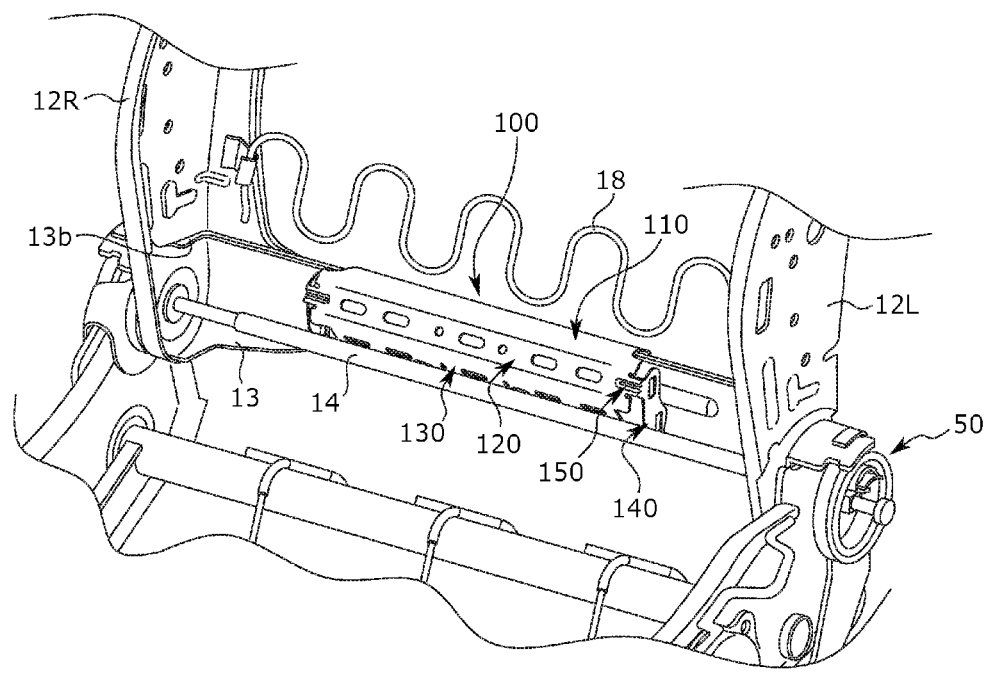
FIG. 5 is an enlarged view of a principal portion of the vehicle seat frame, and an enlarged view of an attachment portion of a hip support member of FIG. 2.
Figure 6:
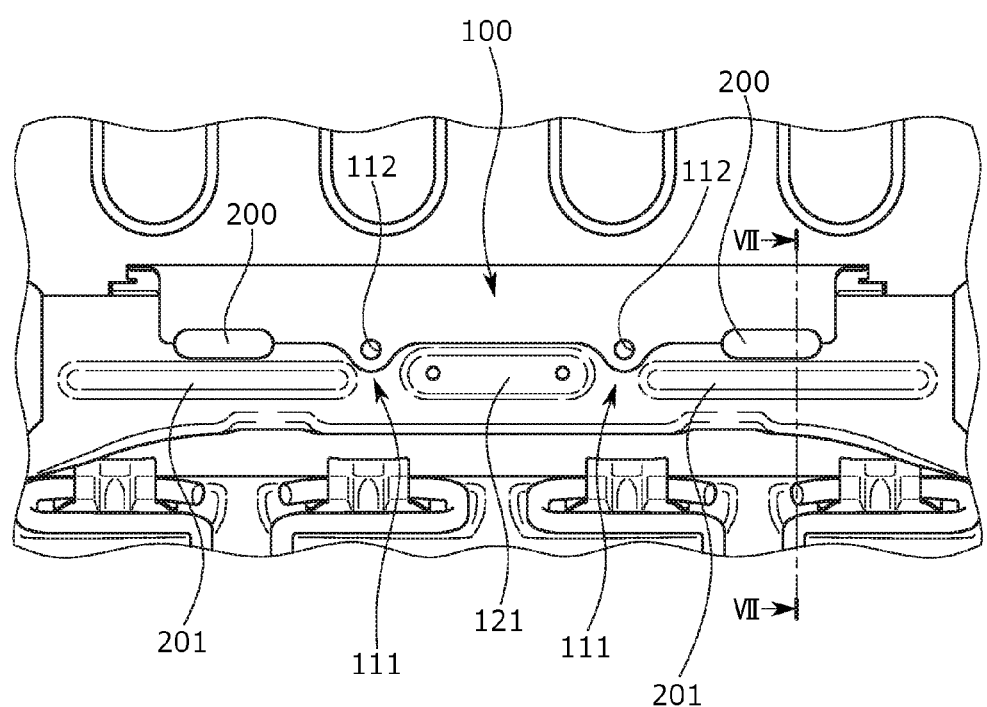
FIG. 6 is a rear view of the attachment portion of the hip support member.
Figure 7:
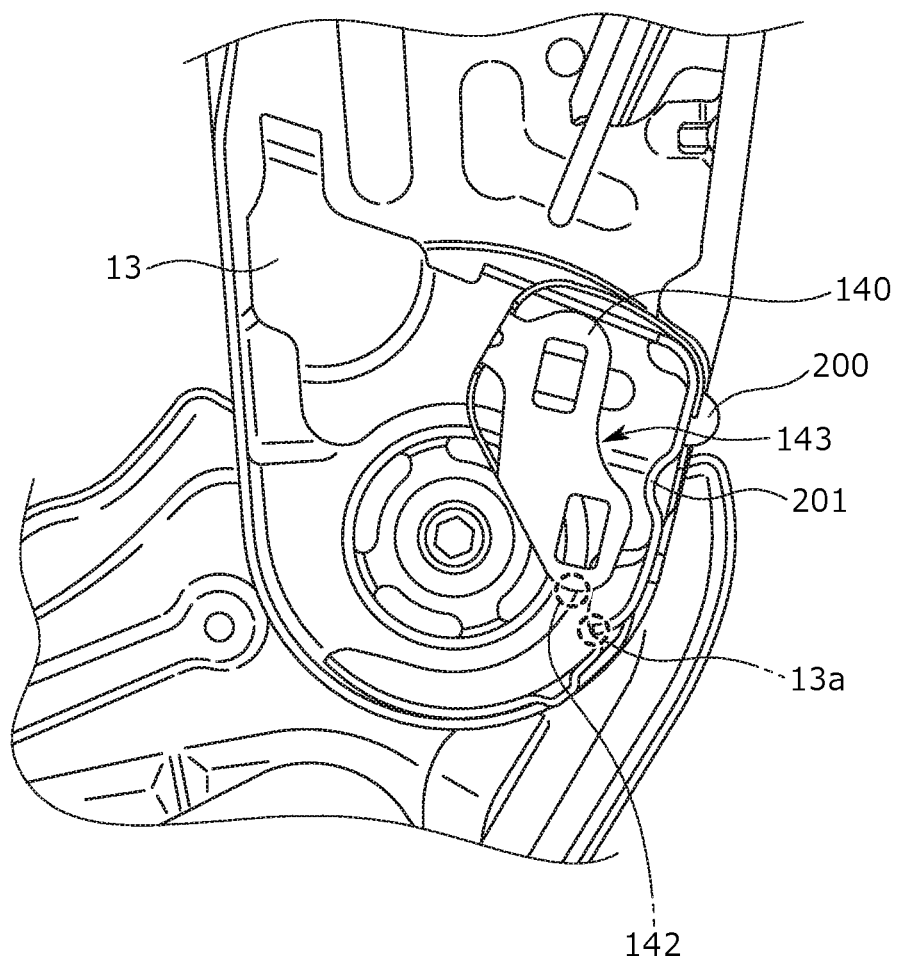
FIG. 7 is a cross sectional view of the attachment portion of the hip support member.
Figure 8:
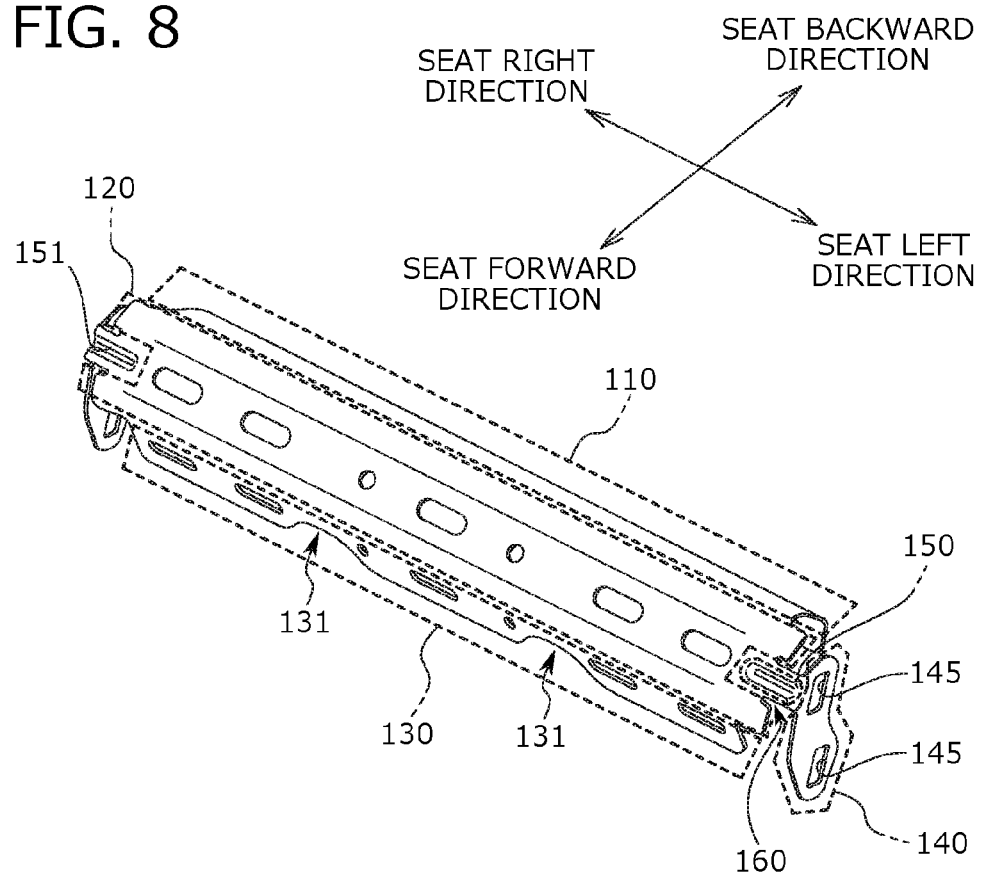
FIG. 8 is a perspective view of the hip support member.
Figure 9:
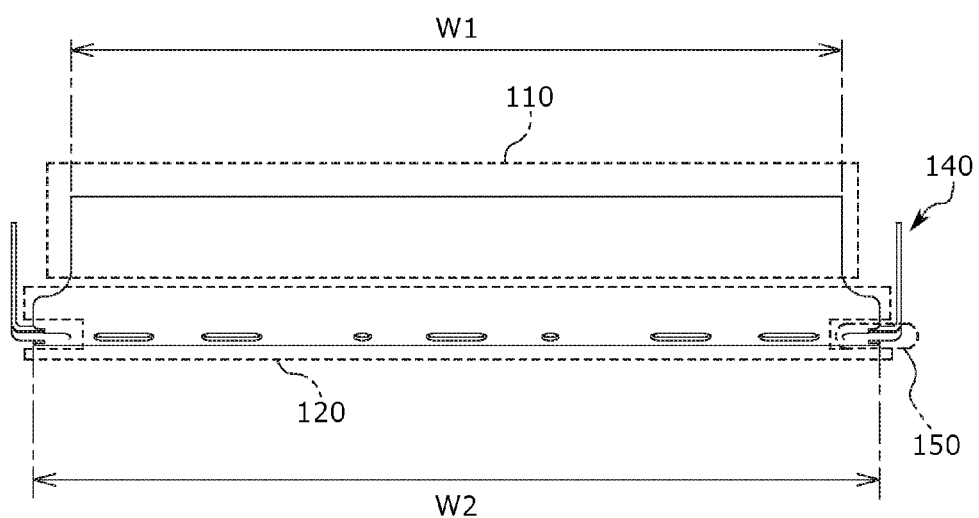
FIG. 9 is a plan view of the hip support member.
Figure 10:
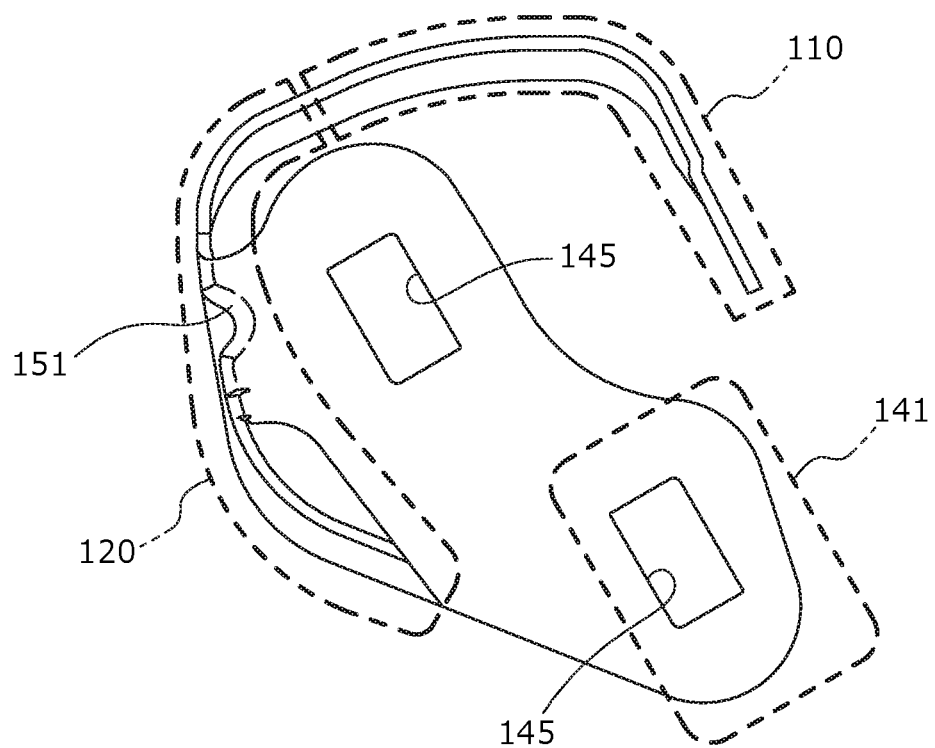
FIG. 10 is a side view of the hip support member.
Figure 11:
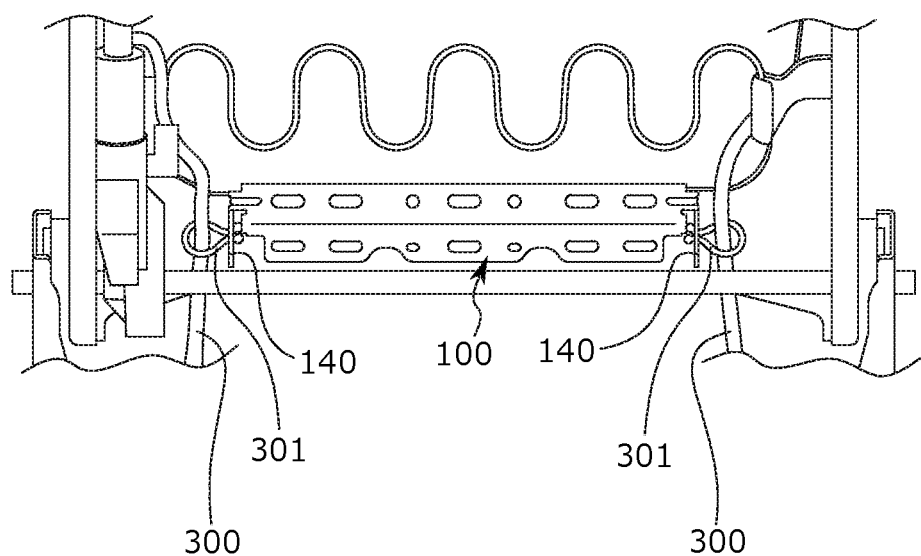
FIG. 11 is a partial plan view of the ship support member showing a state where a wire harness is attached to the hip support member.

FIG. 5 is an enlarged view of a principal portion of FIG. 2, and shows the coupling position between the hip support member 100 and the bottom frame 13. Moreover, a rear view of the coupling position between the hip support member 100 and the bottom frame 13 is shown in FIG. 6, and a cross sectional view made on a plane and in a direction indicated by arrows VII in FIG. 6 is shown in FIG. 7. Further, a perspective view of the hip support member 100 is shown in FIG. 8, a plan view of the hip support member 100 is shown in FIG. 9, and a side view of the hip support member 100 is shown in FIG. 10. A construction example of a case where a wire harness is attached to the hip support member 100 is shown in FIG. 11.

The hip support member 100 is attached to the bottom frame 13 so that a surface supporting the hip (hip support region 120) is positioned between the reclining shaft 14 and the bottom frame 13 in the seat front to back direction as shown in FIG. 5. Interference with the reclining shaft 14 can be prevented even in a case where the hip support member 100 bends in a normal seating state by arranging the hip support member 100 backward with respect to the reclining shaft 14 in this way, thereby suppressing generation of a contact sound.

Moreover, a flange portion 13b of the bottom frame 13 extends in the seat widthwise direction from a portion at which the bottom frame 13 connects to the seatback side frame 12L to a portion at which the bottom frame 13 connects to the seatback side frame 12R as shown in FIG. 5. Ends of the flange portion 13b are configured to be respectively positioned near portions above portions at which the reclining shaft 14 passes though the bottom frame 13.

Moreover, the hip support member 100 includes a coupling region 110, the hip support region 120, a backward extension region 130, bent portions 140, and connection portions 150 as shown in FIG. 8 to FIG. 10. The coupling region 110 is a portion coupled to the bottom frame 13, and extending in the seat widthwise direction. The hip support region 120 is a portion extending from the coupling region 110 toward the seat forward direction, and supporting the hip of the passenger. The rear extension region 130 is a portion extending from the hip support region 120 to the seat backward direction. The bent portion 140 is a portion formed by bending an end in the seat widthwise direction of the hip support member 100 toward the inside of the seat widthwise direction. The connection portion 150 is a portion that connects between the hip support region 120 and the bent portion 140. A detailed description is now given of the respective portions of the hip support member 100.

First, a description is given of a construction of the coupling region 110 in the hip support member 100. As shown in FIG. 9, a length W1 in the seat widthwise direction of the coupling region 110 is less than a length W2 in the seat widthwise direction of the hip support region 120. In other words, the length W2 in the seat widthwise direction of the hip support region 120 is more than the length W1 in the seat widthwise direction of the coupling region 110.

This configuration where the length in the seat widthwise direction of the hip support region 120 is more than the length in the seat widthwise direction of the coupling region 110 can reduce the size of the coupling region 110 while a surface of the hip support region 120 is sufficiently provided, thereby stably supporting the hip of the passenger. In other words, the above-described construction can reduce the size of the attachment portion to the bottom frame 13, thereby providing an overall reduction in the weight while the hip support function of the hip support member 100 is provided.

Moreover, when the hip support member 100 is viewed from the seat upward side as shown in FIG. 9, a shape increasing in the width (width in the seat widthwise direction) from the coupling region 110 to the hip support region 120 (such as a flare shape) is formed. The formation of the coupling region 110 and the hip support region 120 in this shape enables the coupling region 110 to stably support the hip support region 120, and to distribute, in a well-balanced manner, the load of the passenger received by the hip support region 120 for the transmit to the coupling region 110.

Moreover, the coupling region 110 is in an approximately L shape formed by bending a seat backward portion toward the seat downward direction as shown in FIG. 10. Then, the coupling region 110 is fixed by means of welding to the bottom frame 13 at a downward end bent toward the seat downward direction as shown in FIG. 6 and FIG. 7.

Moreover, protrusions 111 protruding in the seat downward direction are formed at a seat bottom end on a rear surface side of the coupling region 110 at positions on both sides of a bead portion 121 protruding toward the seat outside of the bottom frame 13 as shown in FIG. 6 and FIG. 7. In this embodiment, positioning holes 112 for determining a coupling position between the coupling region 110 and the bottom frame 13 are formed for the respective protrusions 111. Then, the downward end of the coupling region 110 is welded and fixed by means of arc welding, for example, at welding portions 200 positioned above bead portions 201 extending in the seat widthwise direction, and recessed toward the seat inside of the bottom frame 13. It should be noted that the welding is not limited to arc welding, and other welding methods such as laser welding may be used. Further, the welding portions 200 and the positioning holes 112 are provided to be positioned approximately on a straight line in the seat widthwise direction according to this embodiment as shown in FIG. 6.

A description is now given of a construction of the hip support region 120 in the hip support member 100. The hip support region 120 is a portion serving as a surface for supporting the hip when the hip support member 100 is attached to the bottom frame 13 as shown in FIG. 5. Then, a reduction in the weight of the hip support member 100 is provided by forming multiple holes in a circular shape and an approximately ellipsoidal shape in the hip support region 120 as shown in FIG. 8.

Moreover, the connection portions 150 to the bent portions 140 are provided on the ends in the seat widthwise direction of the hip support region 120. In this embodiment, cutout portions 160 are provided in a periphery of the connection portion 150 (in other words, in the seat front to back direction) as shown in FIG. 8. A deformation of a surface of the hip support region 120 is suppressed by providing the cutout portions 160 in this way when the bent portion 140 is bent inward in the seat widthwise direction.

On the other hand, reinforcement portions 151 in a bead shape protruding inward of the hip support member 100, in other words, toward the bottom frame 13 side, are provided on the connection portion 150 as shown in FIG. 8 and FIG. 10, and the rigidity of the connection portions 150 are increased by providing the reinforcement portions 151.

A description is now given of a construction of the bent portion 140 in the hip support member 100. The bent portion 140 is connected to the outside in the seat widthwise direction of the connection portion 150 as shown in FIG. 9, and is formed by bending a connection position to the connection portion 150 at approximately perpendicularly toward the seat backward side. In this embodiment, the bent portion 140 includes a bent-portion backward extension region 141 extending toward the seat backward side, namely, the bottom frame 13 side, as shown in FIG. 7 and FIG. 10.

On the other hand, a bottom-frame bottom end 13*a* forming an end toward a seat downward direction of the bottom frame 13 is positioned further toward the seat downward direction than a bent-portion bottom end 142 forming an end in the seat downward direction in the bent-portion backward extension region 141 of the bent portion 140 as shown in FIG. 7. Further, the bottom-frame bottom end 13*a* extends toward the seat forward side, namely the hip support member 100 side. The bent-portion backward extension region 141 and the forward extension region of the seat bottom portion of the bottom frame 13 are configured to be arranged at positions opposing each other in a separated state in this way as shown in FIG. 7.

The bent-portion backward extension region 141 is arranged at the position at which the bent-portion backward extension region 141 does not abut against the forward extension region of the bottom frame 13 in a normal state in this way. It should be noted that the bent-portion backward extension region 141 abuts against the forward extension region of the bottom frame 13 as a result of the application of the load of the passenger on the hip support region 120 during a rear end collision, thereby deforming the bent portion 140. As a result, an impact is absorbed by the bent portion 140 during the rear end collision.

Moreover, a recess 143 recessed toward the seat forward side out of an edge on the seat backward side of the bent portion 140 and the bead portion 201 protruding to the seat forward side of the bottom frame 13 are arranged to oppose each other as shown in FIG. 7. As a result, the bead portion 201 of the bottom frame 13 is prevented from abutting against the bent portion 140 in the normal state. The hip support member 100 and the bottom frame 13 can be formed in a compact manner in this way, and an increase in the size of the seat frame can be suppressed.

Moreover, holes (member attachment holes 145) that are used to attach a member that forms a portion of the vehicle to the bent portion 140 are formed on the bent portion 140 as shown in FIG. 10. Though two of the member attachment holes 145 are provided on the bent portion 140 according to this embodiment, the number of the member attachment holes 145 is not limited to this case, and may be one or three or more.

For example, a wire harness can be attached to the bent portion 140 by engaging clips for attaching the wire harness with the member attachment holes 145 as shown in FIG. 11. Spaces from the hip support member 100 to the seatback side frames 12L and 12R can efficiently be used by providing the member attachment holes 145 capable of attaching a member in the bent portion 140 in this way.

A description is now given of a construction of the backward extension region 130 in the hip support member 100. An end of the seat backward side of the backward extension region 130 is positioned further toward the seat forward direction than the end on the seat backward side of the bent portion 140 as shown in FIG. 10, and the backward extension region 130 is configured not to abut against the bottom frame 13 in the normal state. It should be noted that the bent portion 140 abuts against the bottom frame 13 as a result of the application of the load of the passenger to the hip support region 120 when a high impact is applied during a rear end collision, and the backward extension region 130 then abuts against the bottom frame 13. The backward extension region 130 is wider in a surface abutting against the bottom frame 13 than the bent portion 140. Therefore, the hip of the passenger is prevented from backward movement by the backward extension region 130 abutting against the bottom frame 13, thereby supporting the hip support region 120 during the rear end collision as described above.

Moreover, recesses 131 are formed on an edge portion on the seat downward side of the backward extension region 130, resulting in an edge portion in a recessed and protruded shape as shown in FIG. 8. Further, multiple circular and approximately ellipsoidal holes are formed on a surface of the backward extension region 130. As a result, a reduction in the weight of the hip support member 100 is provided.

With the above-described vehicle seat frame F1 according to this embodiment, the size of the coupling region 110 for coupling the hip support member 100 to the seatback frame 10 can be reduced while the size of the hip support region 120 that supports the hip of the passenger is secured in the hip support member 100. In other words, with the vehicle seat frame F1, a seat frame that is high in the impact absorption property for the rear end collision, and is reduced in the weight can be provided by providing the hip support member 100 that can be reduced in the size while the hip of the passenger is stably supported on the wide surface.

Moreover, the rigidity of the hip support region 120 that supports the hip of the passenger can be increased in the hip support member 100 by providing the bent portions 140 on the ends in the seat widthwise direction of the hip support member 100. In other words, with the vehicle seat frame F1, the impact absorption property for the rear end collision can be increased by more stably supporting the hip of the passenger.

Moreover, the bent portion 140 includes the bent-portion backward extension region 141 extending toward the bottom frame 13, and the extension region of the bent portion 140 thus abuts against the bottom frame 13, resulting in the deformation when the load is applied to the hip support region 120 that supports the hip of the passenger in the hip support member 100. As a result, the bent portion 140 can be caused to absorb the impact. In other words, according to the vehicle seat frame F1, the impact absorption property for the rear end collision can be increased by increasing the impact absorption property of the hip support member 100.

The deformation of the hip support region 120 that supports the hip of the passenger can be suppressed when the bent portions 140 are formed on the hip support member 100 by providing cutout portions 160 in the peripheries of the connection portions 150 between the hip support region 120 and the bent portions 140. Moreover, the bent portions 140 can accurately be formed. In other words, with the vehicle seat frame F1, the hip support region 120 can more stably support the hip of the passenger, and the rigidity can be increased, and the impact absorption property for the rear end collision can thus be increased.

Moreover, the rigidity of the connection portions 150 that connect the hip support region 120 and the bent portions 140 with each other can be increased by providing the reinforcement regions (reinforcement portions 151) in the shape protruding toward the bottom frame 13 on the connection portions 150. As a result, the extension regions of the bent portions 140 can be caused to accurately abut against the bottom frame 13 when the load is applied to the hip support region 120, resulting in the increase in the collision absorption property of the bent portions 140.

Moreover, the spaces in the seat outside directions from the bent portions 140 can efficiently be used by providing the member attachment portions (member attachment holes 145) to which other members are attached on the bent portions 140. As a result, the space utilization efficiency inside the seat can be increased, and the increase in the size of the seat can thus be suppressed.

As an example, a description is given of the case in which the hip support member 100 according to this embodiment is applied to the vehicle seat frame including the mechanism for manually adjusting the position adjustment mechanisms (the front to back position, the up and down position, and the angle of the seatback) for the vehicle seat S according to the above-described embodiment. The hip support member 100 can be similarly applied to a vehicle seat frame in which the position adjustment mechanism for the vehicle seat S is adjusted by electric actuators.

Figure 12:
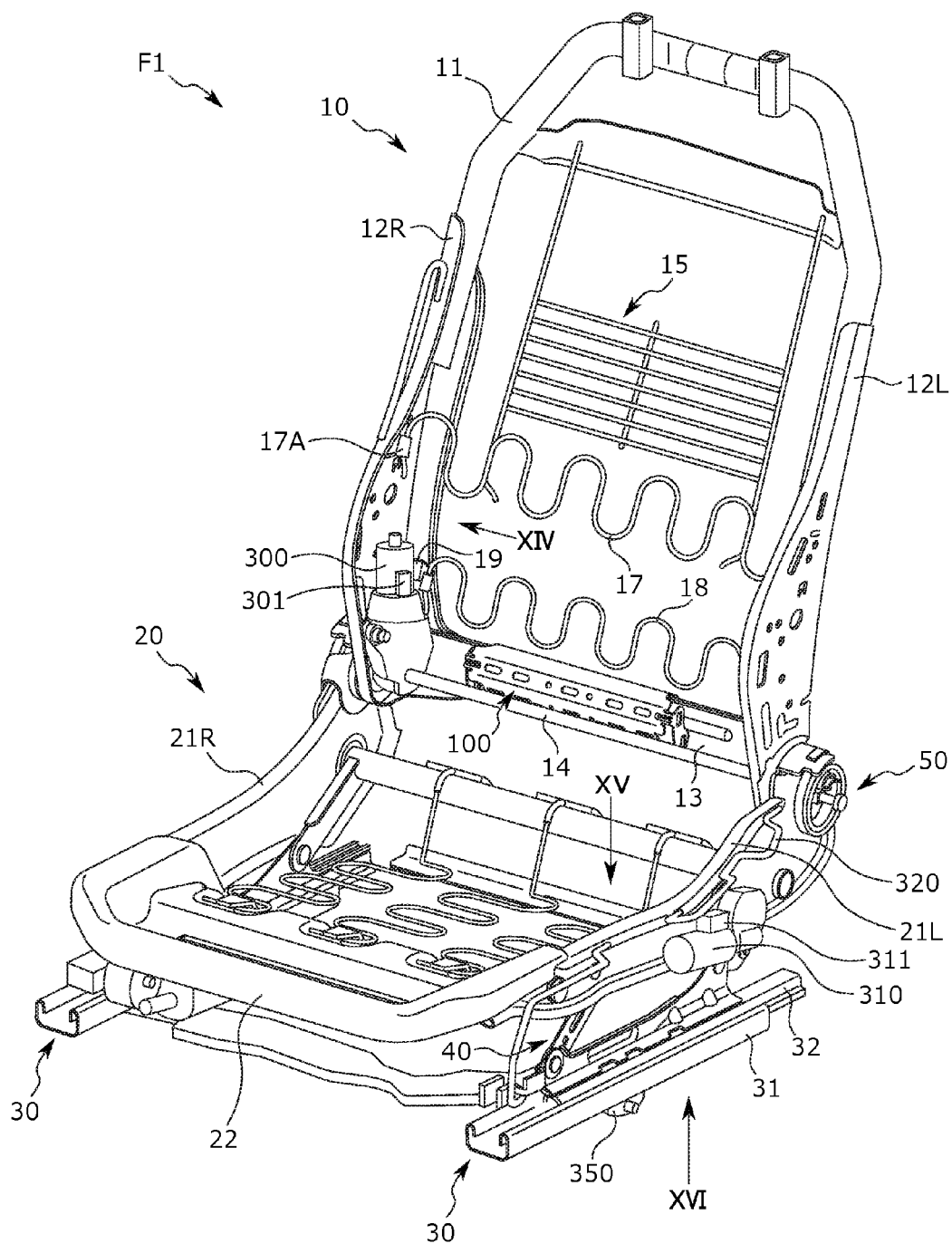
FIG. 12 is a perspective view of the vehicle seat frame according to a second embodiment.
Figure 13:
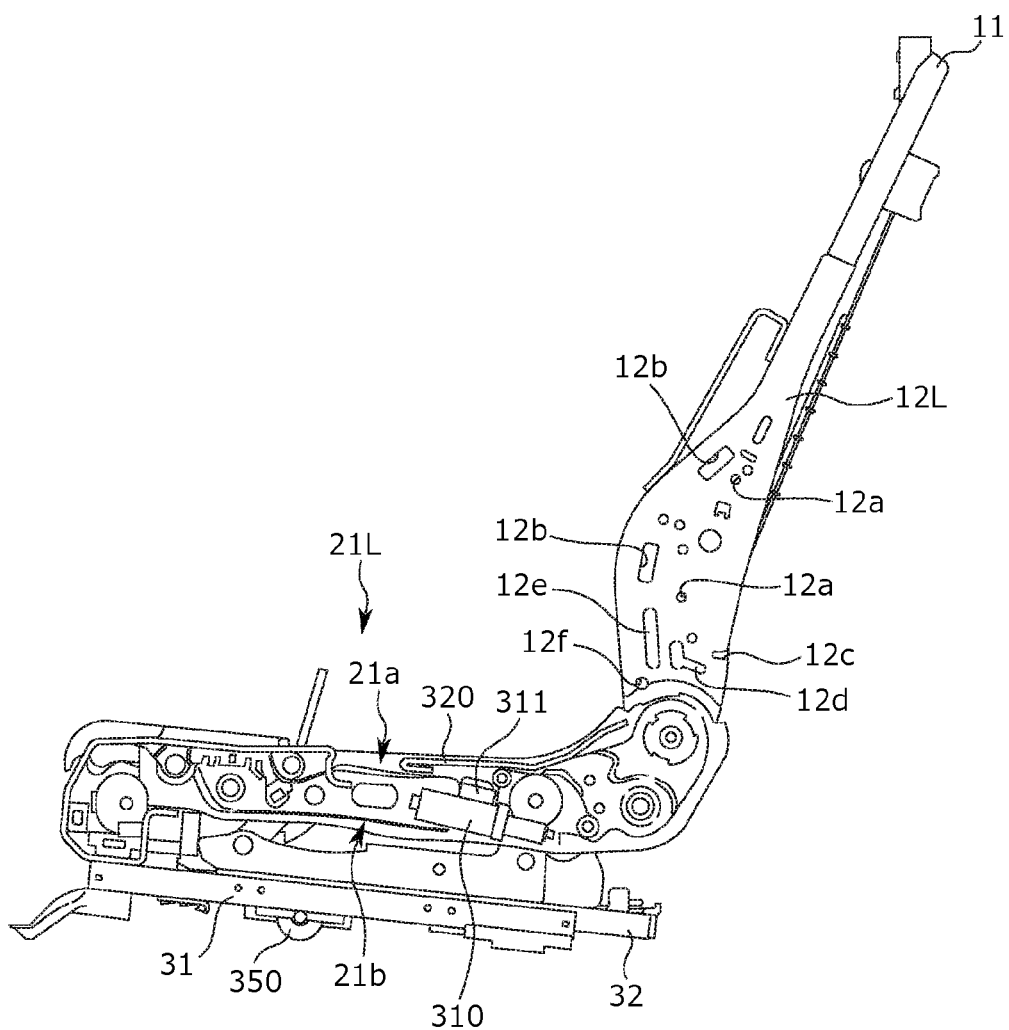
FIG. 13 is a side view of the vehicle seat frame according to the second embodiment.
Figure 14:
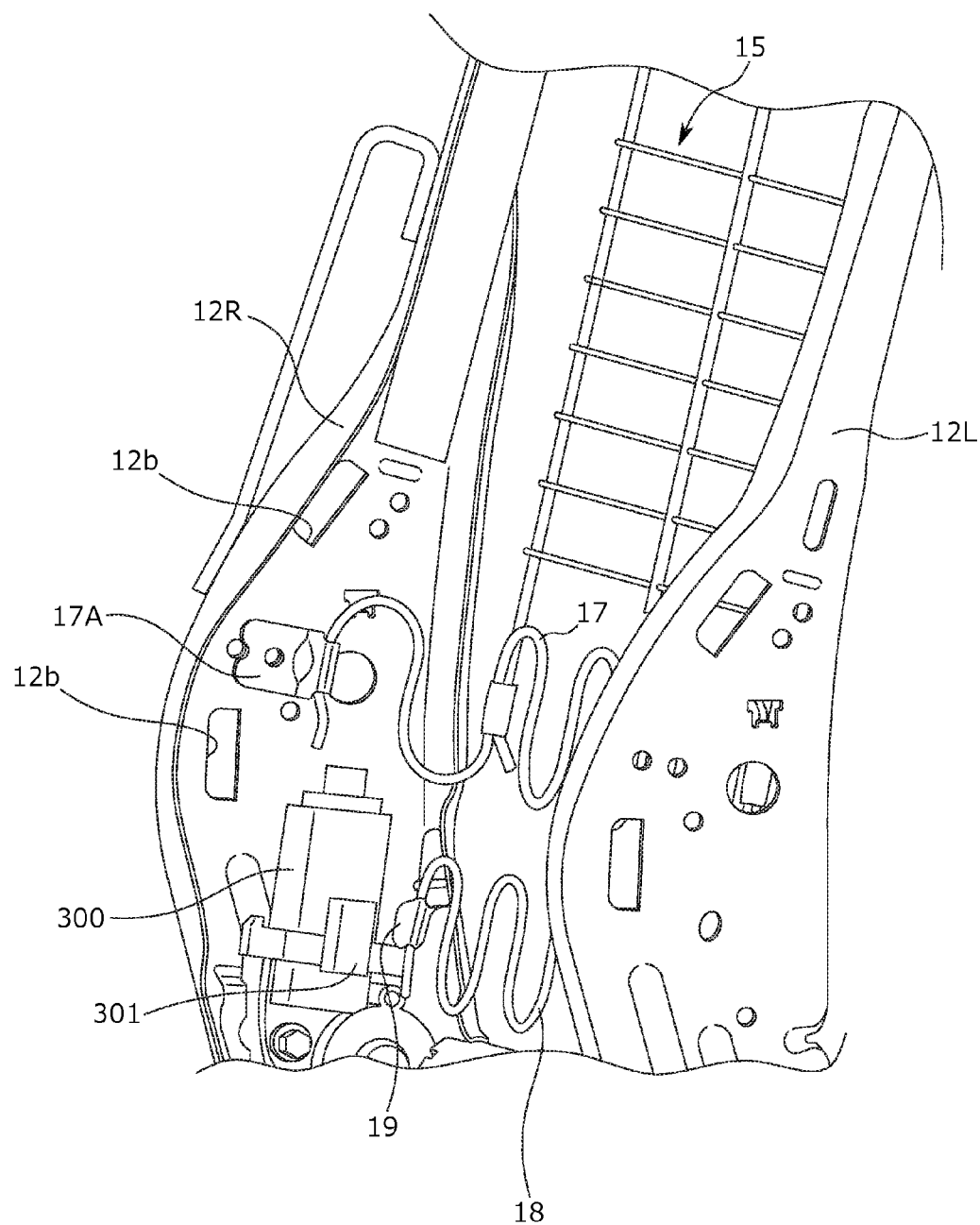
FIG. 14 is a partial enlarged view of an attachment position of an S spring on the vehicle seat frame according to the second embodiment.
Figure 15:
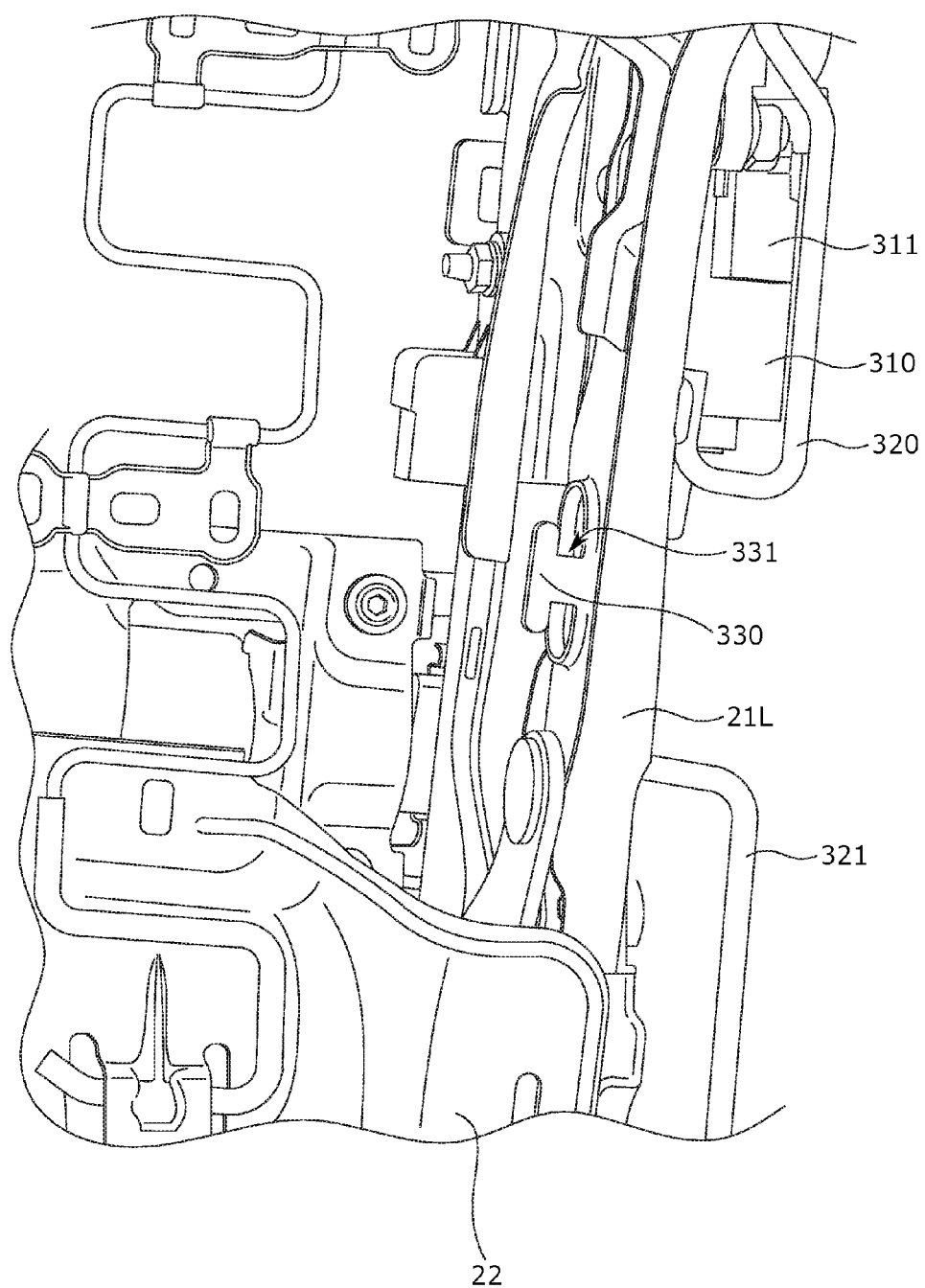
FIG. 15 is a partial enlarged view of an inside of a cushion side frame of the vehicle seat frame according to the second embodiment.
Figure 16:
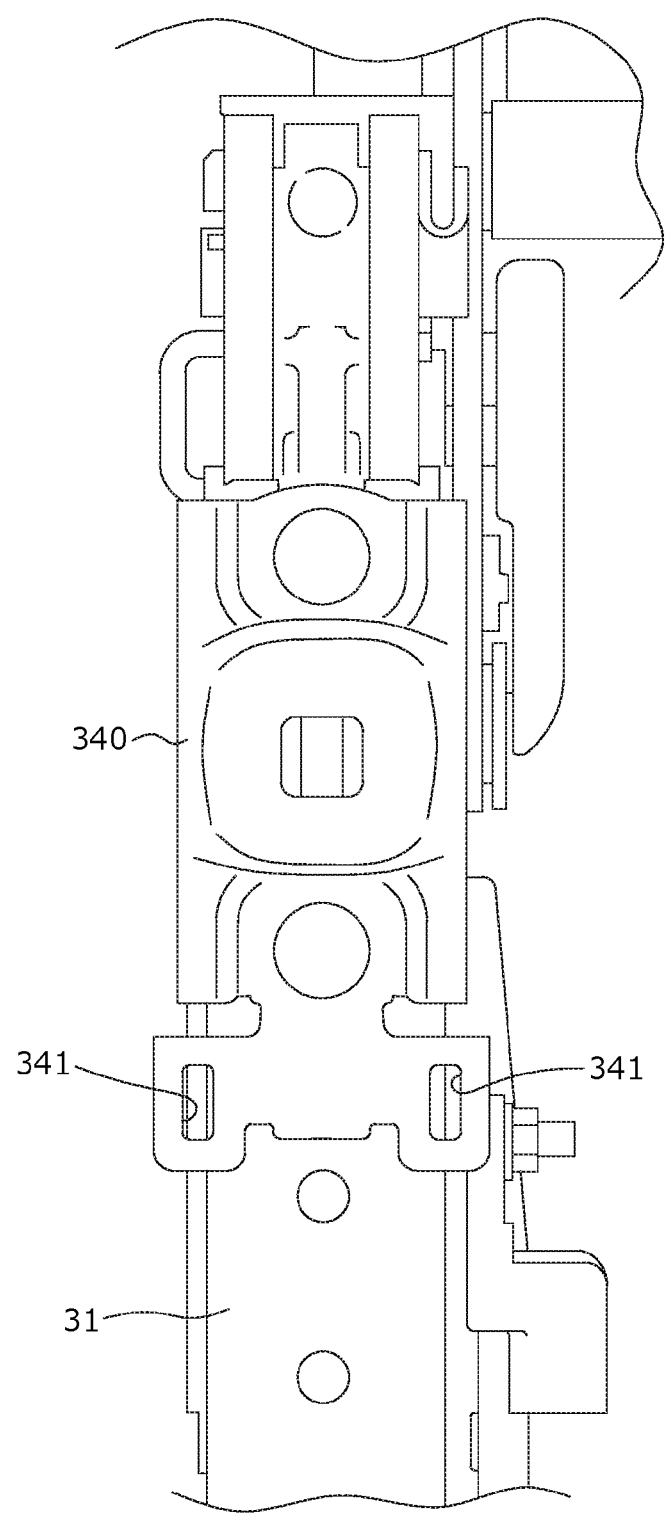
FIG. 16 is a partial enlarged view of a rail rear surface on the vehicle seat frame according to the second embodiment.

A perspective view of a vehicle seat frame F2 serving as a frame of the vehicle seat S in which the position adjustment mechanism is electrically adjusted is shown in FIG. 12, and a side view of the vehicle seat frame F2 is shown in FIG. 13. Moreover, a partial enlarged view of attachment positions of the S spring 17 and the S spring 18 on the vehicle seat frame F2 is shown in FIG. 14, which is a view on an arrow XIV in FIG. 12. A partial enlarged view of an inside of the cushion side frame 21L in the vehicle seat frame F2 is shown in FIG. 15, which is a view on an arrow XV in FIG. 12. A partial enlarged view relating to a rear surface of the lower rail 31 in the vehicle seat frame F2 is shown in FIG. 16, which is a view on an arrow XVI in FIG. 12.

The construction of the seatback frame 10 of the vehicle seat frame F2 is generally the same as the vehicle seat frame F1 as shown in FIG. 12 and FIG. 13, and a description is now given of different points.

An actuator 300 that generates a driving force for adjusting the angle of the reclining mechanism 50 is attached to a periphery of the joint portion between the bottom frame 13 and the seatback side frame 12R in the vehicle seat frame F2 as shown in FIG. 12 and FIG. 14. Moreover, a connector 301 to which a cable is connected is provided in the actuator 300, and a driving electric power, a control signal, and the like are input via the cable and the connector 301 to the actuator 300.

Moreover, the connector 301 is arranged at a position at which the connector 301 overlaps the S spring hook bracket 19 provided on the seatback side frame 12R side in the seat front to back direction. The internal space of the vehicle seat frame F2 can be efficiently used, and the connector 301 can be protected when an impact is input from the backward side by arranging the connector 301 and the S spring hook bracket 19 in this way.

Moreover, a lock portion 17A that locks the S spring 17 is provided between the top and bottom webbing clip attachment holes 12b of the seatback side frame 12R as shown in FIG. 14. A portion to which a force is applied when the airbag is deployed can be reinforced by arranging the lock portion 17A between the webbing clip attachment holes 12b in this way. It should be noted that a lock portion 17A is provided between the top and bottom webbing clip attachment holes 12b also on the seatback side frame 12L.

Moreover, the bead portion 21a and the bead portion 21b extending from the center portion to the forward portion are provided respectively on the upward end and the downward end on the side surface on the seat outside of the cushion side frame 21L as shown in FIG. 13. Then, an actuator 310 that operates the movable portions of the height adjustment mechanism 40 is attached between the top and bottom bead portion 21a and bead portion 21b. The vehicle seat S can be constructed in a compact manner by efficiently using a space between the top and bottom bead portion 21a and bead portion 21b in this way.

Moreover, a connector 311 to which a cable is connected is provided in the actuator 310 that operates the height adjustment mechanism 40, and a driving electric power, a control signal, and the like are input via the cable and the connector 311 to the actuator 310. In this embodiment, the connector 311 is arranged downward with respect to a wire 320 for fixing a cover for the vehicle seat S as shown in FIG. 12, FIG. 13, and FIG. 15. The connector 311 can be protected when an impact is input from the upward side by arranging the connector 311 downward with respect to the wire 320 in this way.

Moreover, an actuator 350 that operates the slide rail mechanism 30 is attached downward with respect to the lower rail 31 as shown in FIG. 13.

Moreover, a cut and raised portion 330 that is cut and raised from a hole portion 331 toward the seat upward direction is provided between the respective attachment portions of the wire 320 and the wire 321 on the cushion side frame 21L, and on a seat inside side surface of the cushion side frame 21L as shown in FIG. 15. A movement of a harness in the seat widthwise direction can be suppressed by fixing a harness to a portion extending in the seat widthwise direction in the cut and raised portion 330 by means a binding tool (e.g., a binding band or clamp).

Moreover, a bracket under rail 340 on which engagement holes 341 with which pawls of a foot cover of the vehicle seat S are engaged is attached to a bottom surface on the seat backward side of the lower rail 31 as shown in FIG. 16. The foot cover can stably be fixed to the vehicle seat frame F2 by providing the bracket under rail 340.

It should be understood that the cut and raised portion 330 and the bracket under rail 340 can be provided for the vehicle seat frame F1.

Height Adjustment Mechanism

A detailed description is now given of the height adjustment mechanism 40 provided for the vehicle seat frame F1 based on FIG. 17 to FIG. 25.

Figure 17:
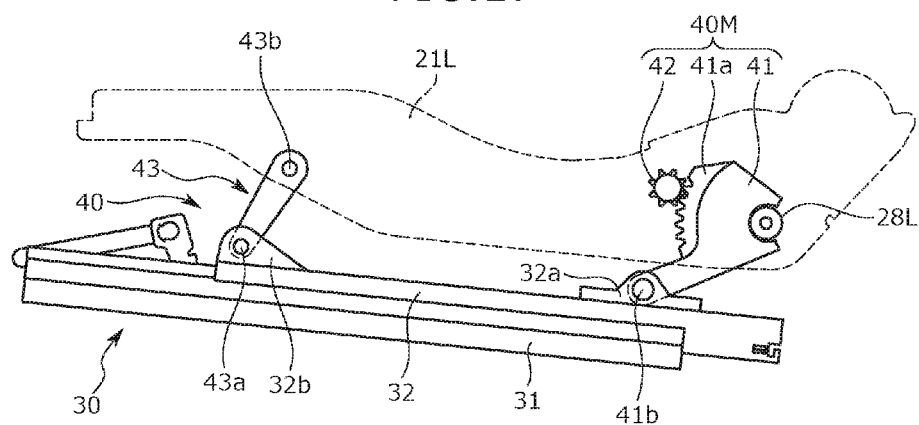
FIG. 17 is a schematic diagram of a height adjustment mechanism.
Figure 18:
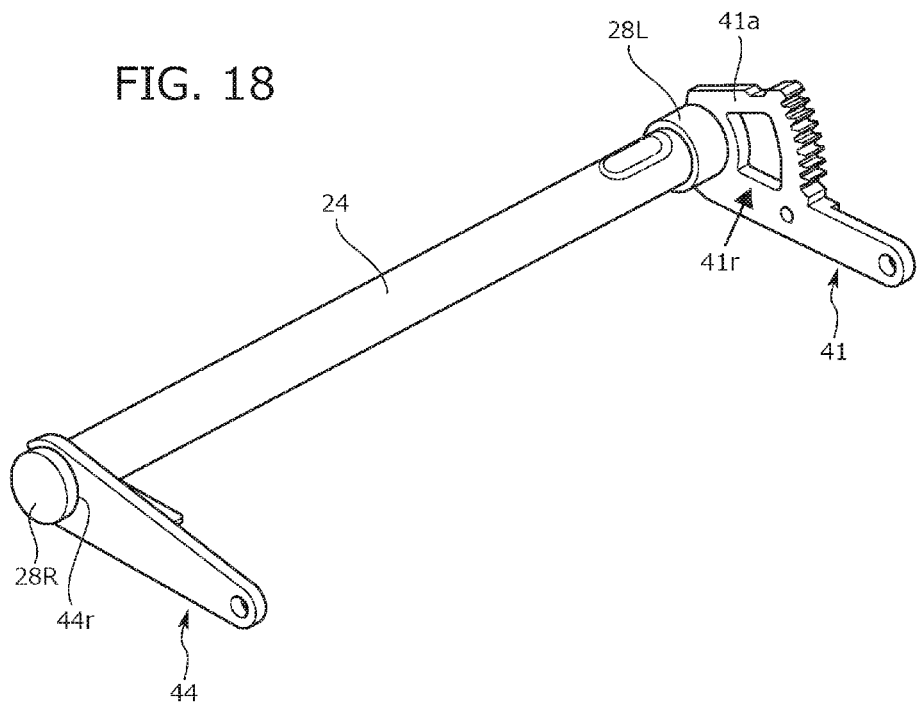
FIG. 18 is a perspective diagram of the height adjustment mechanism.

Diagrams illustrating a general construction of the height adjustment mechanism 40 are shown in FIG. 17 and FIG. 18.

Figure 19:
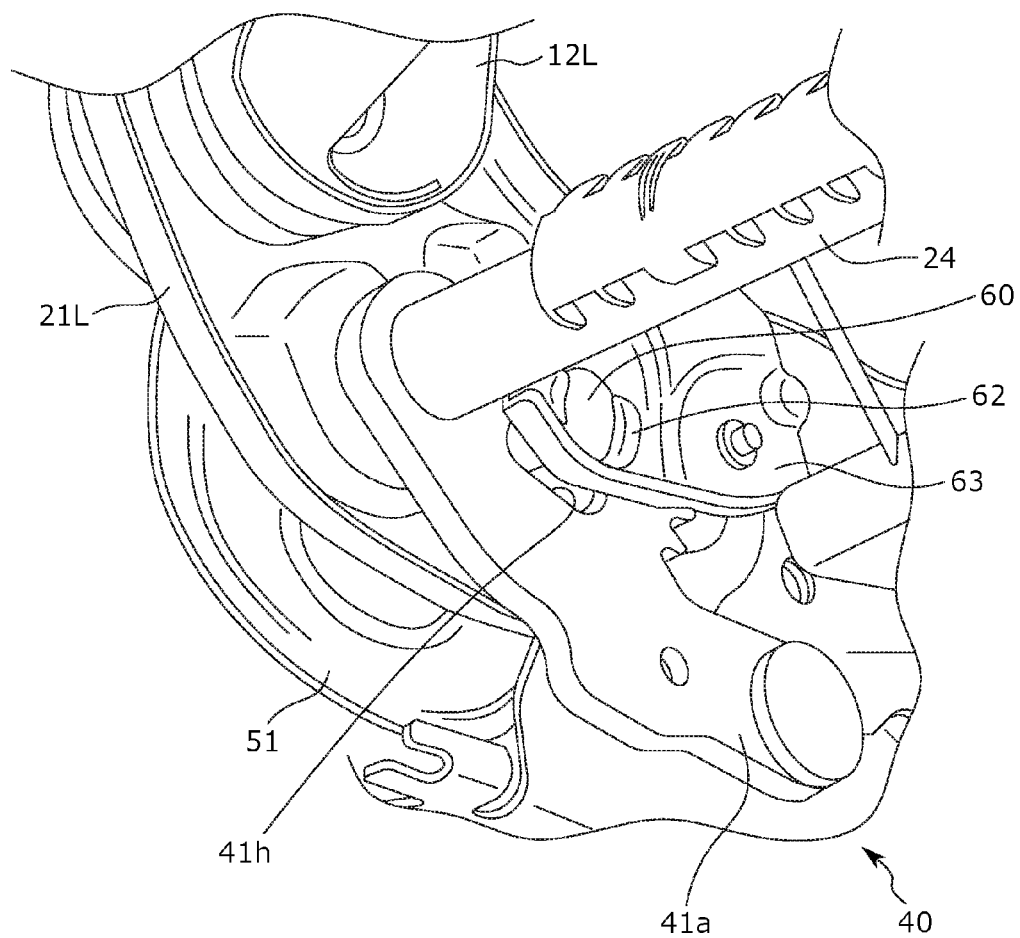
FIG. 19 is a partial perspective view along an arrow XIX in FIG. 2.
Figure 20:
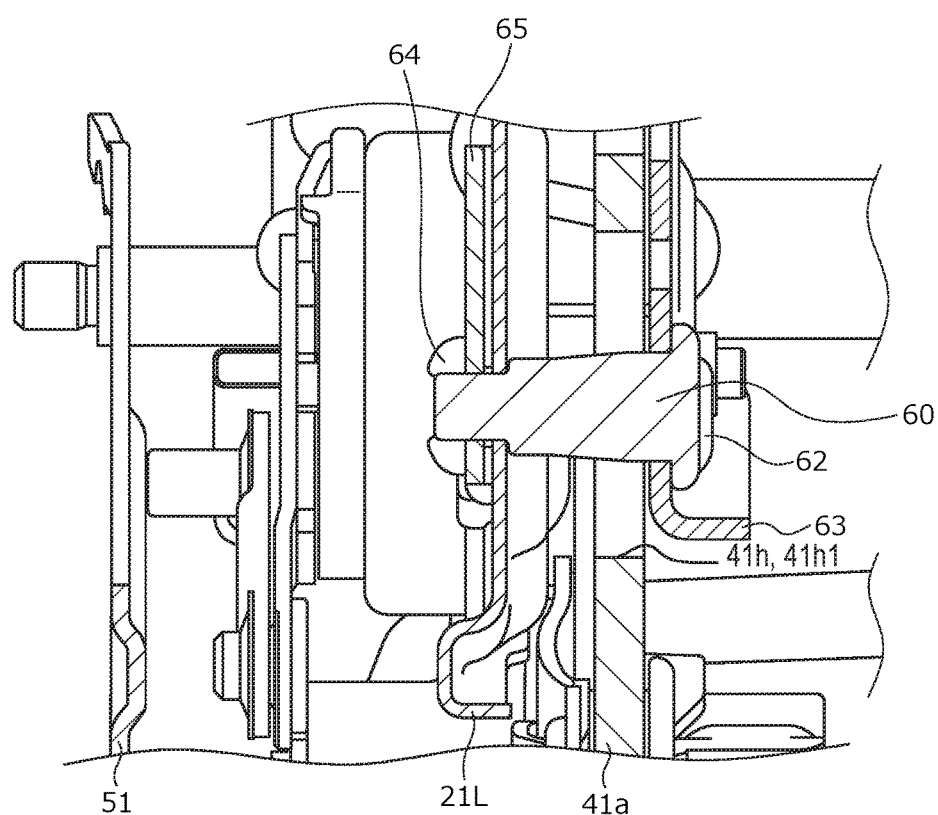
FIG. 20 is a partial, cross sectional view made on a plane and in a direction indicated by arrows XX in FIG. 3.
Figure 21A:
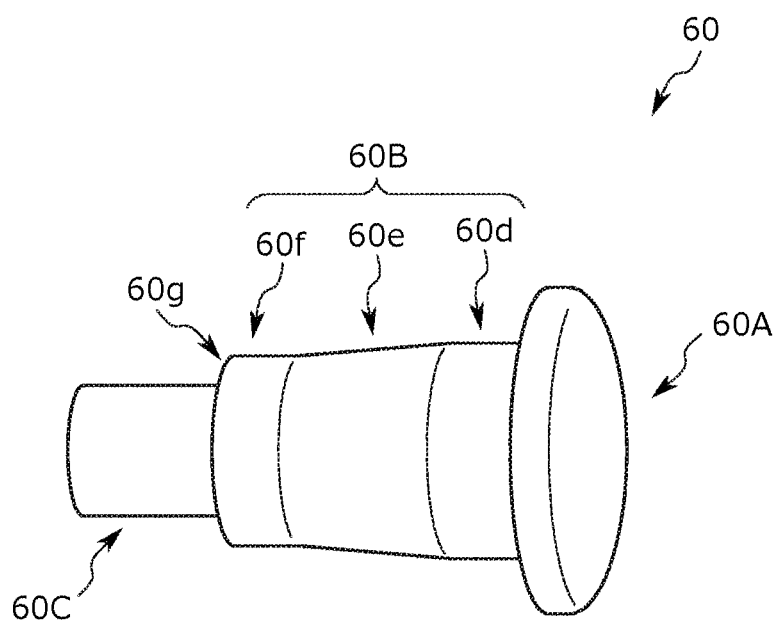
FIG. 21A is a perspective view of a restriction member.
Figure 21B:
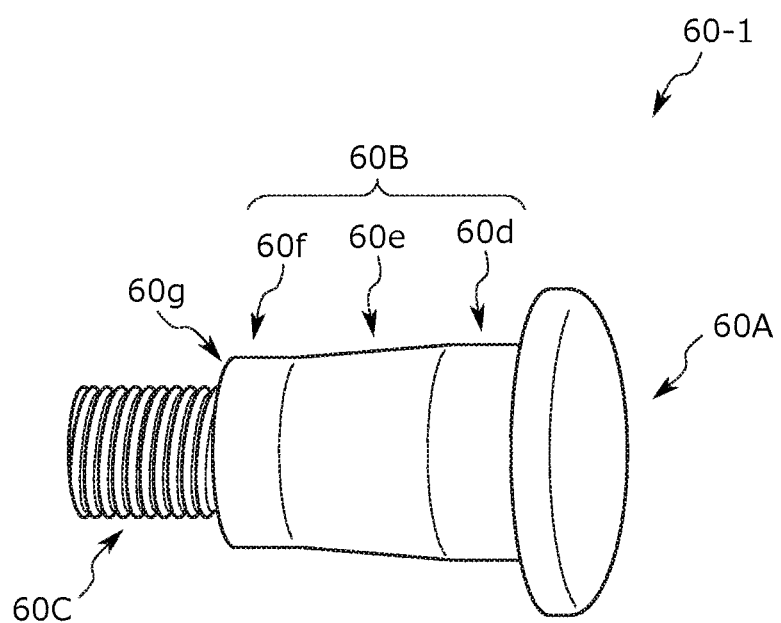
FIG. 21B is a perspective view of the restriction member on a tip portion of which a thread is formed.
Figure 22:
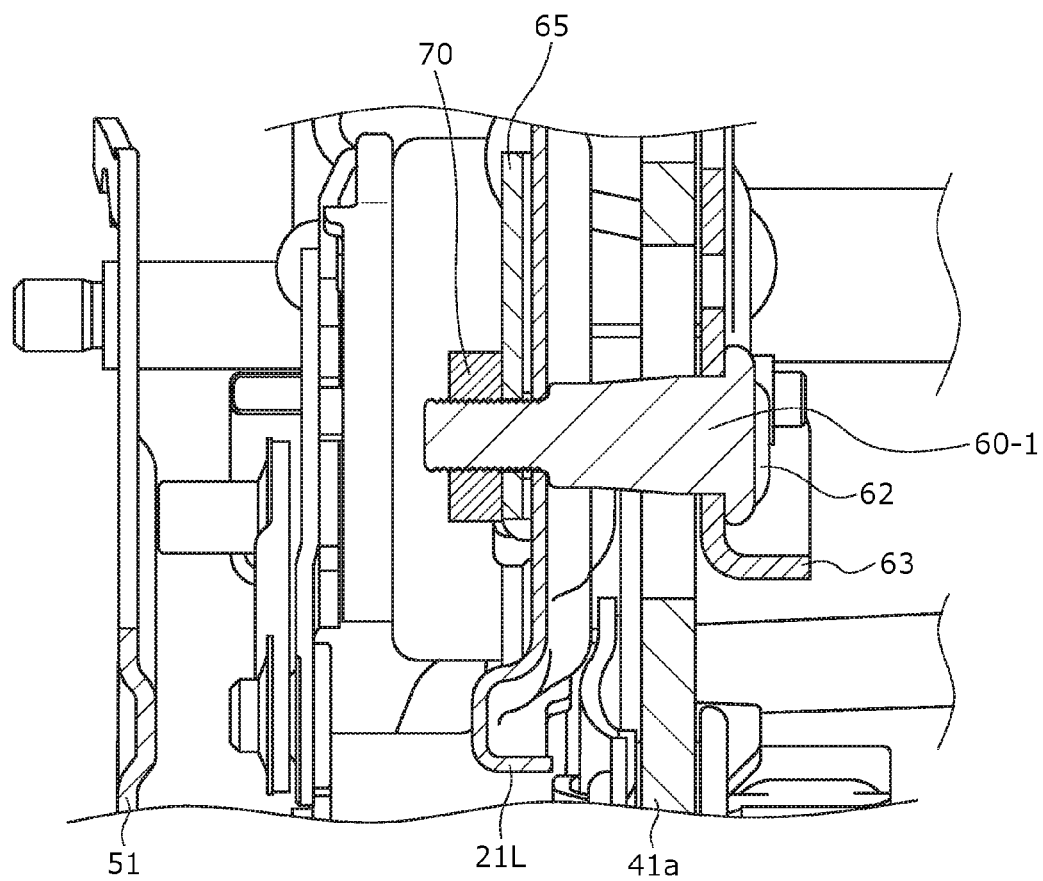
FIG. 22 is a partial, cross sectional view made on the plane and in the direction indicated by arrows XX in FIG. 3 when a nut is used to attach the restriction member.

A partially enlarged view of a sector gear 41a of the height adjustment mechanism 40 and an attachment position of a restriction member 60 that restricts a movement of the sector gear 41a is shown in FIG. 19, which is a view on an arrow XIX in FIG. 2. Moreover, a cross sectional view relating to the attachment position made on a plane and in a direction indicated by arrows XX in FIG. 3 is shown in FIG. 20. An outside view of the restriction member 60 is shown in FIG. 21A, and an outside view of a restriction member 60-1 on which a thread is formed at a tip portion 60C is shown in FIG. 21B. Then, a cross sectional view made on the plane and in the direction indicated by arrows XX in FIG. 3 relating to the attachment position when the restriction member 60-1 is attached by using a nut 70 for a threaded engagement with the restriction member 60-1 is shown in FIG. 22.

Figure 23:
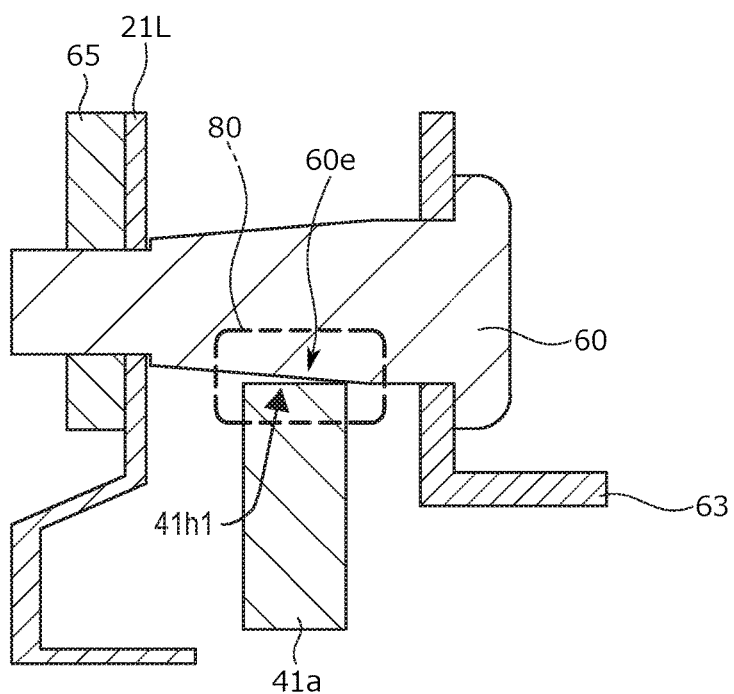
FIG. 23 is a schematic view showing an abutment form between the restriction member and a sector gear.
Figure 24:
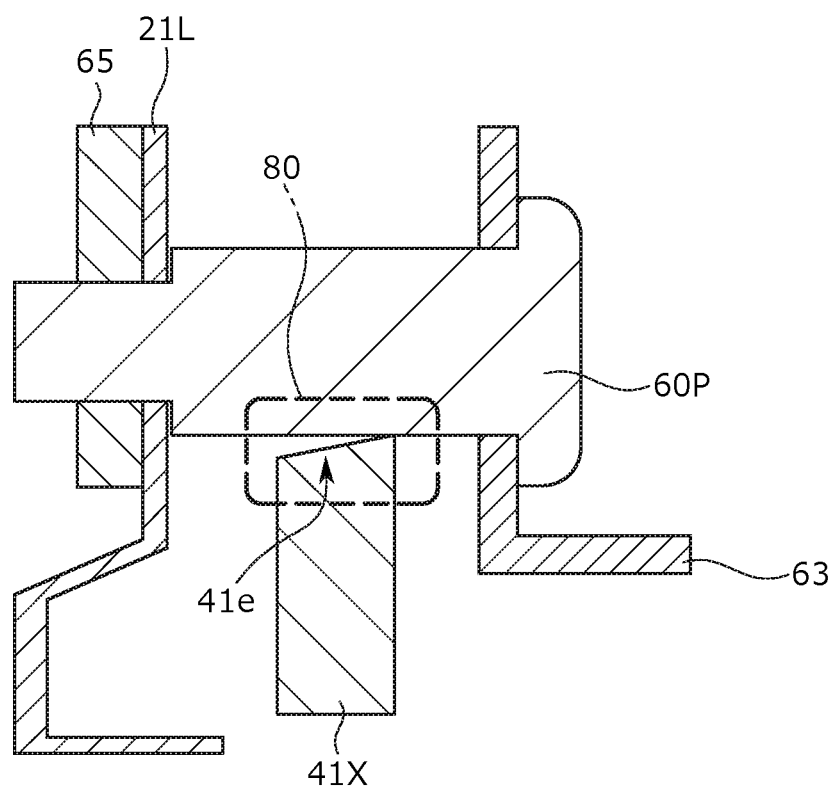
FIG. 24 is a schematic view showing an abutment form between the restriction member and the sector gear.
Figure 25:
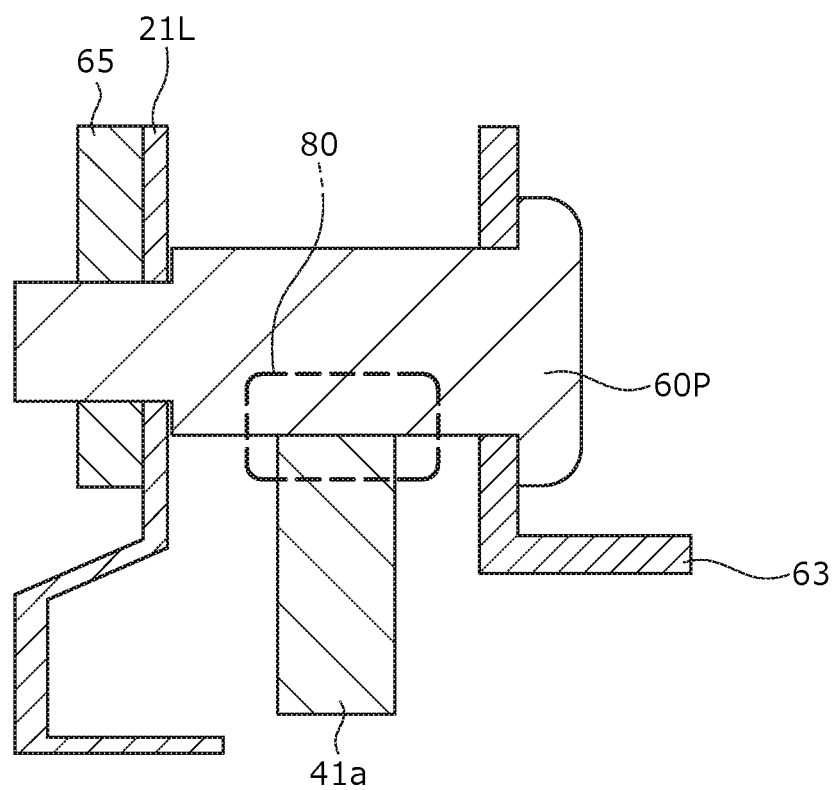
FIG. 25 is a schematic view showing an abutment form between the restriction member and the sector gear.

A schematic view illustrating an abutment form between the restriction member 60 on which a taper is formed and the sector gear 41a is shown in FIG. 23. Moreover, a schematic view illustrating an abutment form between a sector gear 41X on which a taper is formed and a restriction member 60P on which a taper is not formed is shown in FIG. 24. Moreover, a schematic view illustrating an abutment form between the sector gear 41a and a restriction member 60P on both of which a taper is not formed is shown in FIG. 25.

First, a description is given of the general construction of the height adjustment mechanism 40 based on FIG. 17 and FIG. 18. The height adjustment mechanism 40 includes a drive link 41, a pinion gear 42, and driven links 43 and 44 as shown in FIG. 17 and FIG. 18. The drive link 41 and the driven links 43 and 44 swing in the front to back direction and the up and down direction along with the seat cushion S2.

Moreover, the drive link 41 is formed by a metal plate member. The drive link 41 is arranged on the cushion side frame (the cushion side frame 21L according to this embodiment) side on the outside in the seat widthwise direction out of the cushion side frame 21L and the cushion side frame 21R forming the seat cushion frame 20. Moreover, one end in the lengthwise direction of the drive link 41 is supported for rotation via a pivot pin 41b by a link support portion 32a installed on a top surface of the upper rail 32.

Moreover, the other end in the lengthwise direction of the drive link 41 has an external shape in an approximately fan-like shape as shown in FIG. 17 and FIG. 18. Further, gear teeth are formed on a front end on the other end in the lengthwise direction of the drive link 41 in the approximately fan-like shape. In other words, the other end in the lengthwise direction of the drive link 41 forms the sector gear 41a, and meshes with the pinion gear 42 as shown in FIG. 17. The pinion gear 42 is attached for rotation to the cushion side frame 21L provided on the seat cushion frame 20. Moreover, the pinion gear 42 is coupled via a link 45 to the height adjustment operation portion attached to the cushion side frame 21L. It should be noted that a mechanism portion that includes the drive link 41, the sector gear 41a and the pinion gear 42, and mainly operates the height adjustment mechanism 40 is considered as a drive portion 40M, and a mechanism portion that is driven by the operation of the drive portion 40M, thereby adjusting the height of the seat is considered as a driven portion.

The driven link 43 (corresponding to the driven portion of the height adjustment mechanism 40) is a link formed by a metal plate member, and driven by the rotation operation of the drive link 41 to swing. The driven link 43 is supported for rotation by the cushion side frame 21L of the seat cushion frame 20 and the upper rail 32L. Specifically, one end in the lengthwise direction of the driven link 43 is supported for rotation via a pivot pin 43a by a link support portion 32b installed on a top surface of the upper rail 32 as shown in FIG. 17. Moreover, the other end in the lengthwise direction of the driven link 43 is supported for rotation via a pivot pin 43b by a bottom end of the cushion side frame 21L as shown in FIG. 17.

Moreover, the driven link 44 (corresponding to the driven portion of the height adjustment mechanism 40) is paired with the drive link 41 as shown in FIG. 18. Specifically, the drive link 41 and the driven link 44 are coupled to each other by the coupling pipe 24, an end sleeve 28L, and an end sleeve 28R. In more detail, the end in the lengthwise direction of the drive link 41 on the side on which the sector gear 41a is formed includes a semicircular cutout portion 41r on a backward portion thereof. The end sleeve 28L, to which the one end in the seat widthwise direction of the coupling pipe 24 is fit, is fit to the cutout portion 41r, and both thereof are fixed by means of welding. On the other hand, an end in the lengthwise direction of the driven link 44 on a side supported by the cushion side frame 21R includes a semicircular cutout portion 44r on a backward portion thereof. The end sleeve 28R, to which the other end in the seat widthwise direction of the coupling pipe 24 is fit, is fit to the cutout portion 44r, and both thereof are fixed by means of welding.

A description is now given of the operation of the height adjustment mechanism 40 constructed as described above. The pinion gear 42 connected via the link 45 is rotated by an operation by the passenger, who is the seated person, on an operation portion (such as the height adjustment operation portion 46) of the height adjustment mechanism 40. When the pinion gear 42 rotates, a meshing position between the pinion gear 42 and the sector gear 41a changes. In accordance with this change, the drive link 41 and the driven links 43 and 44 rotate. In this embodiment, the end sleeves 28L and 28R welded to the drive link 41 and the driven link 44 and the coupling pipe 24 fixed to the end sleeves 28L and 28R integrally rotate. As a result, the cushion side frame 21L and the cushion side frame 21R of the seat cushion frame 20 rotate about a center axis of the coupling pipe 24, the end sleeve 28L, and the end sleeve 28R as a rotation center relatively therewith. As a result, the seat cushion frame 20 moves up and down, and the height of the seat main body is adjusted.

A description is now given of a construction of a restriction member 60 that restricts the movement of the sector gear 41a and an attachment structure of the restriction member 60 based on the FIG. 19 to FIG. 21A. It should be noted that the restriction member 60 functions as a stopper member that abuts against a wall portion (such as a top end or a bottom end) of a through hole 41h formed on the sector gear 41a, thereby restricting the movement of the sector gear 41a.

First, a description is given of a construction of the restriction member 60 based on FIG. 21A. The restriction member 60 is a cylindrical pin including a head portion 60A, a main body portion 60B, and the tip portion 60C as shown in FIG. 21A.

The head portion 60A is formed into a disk shape, and is larger in the diameter than the main body portion 60B and the tip portion 60C.

The main body portion 60B is formed into an approximately cylindrical shape, a first straight region 60d constant in the diameter (in other words, an invariable cross sectional shape) is provided on a portion connecting to the head portion 60A, and a second straight region 60f constant in the diameter (in other words, an invariable cross sectional shape) is provided on a portion connecting to the tip portion 60C. Then, the diameter (r1) of the first straight region 60d is more than the diameter (r2) of the second straight region 60f.

Then, a tapered region 60e for connecting the first straight region 60d and the second straight region 60f with each other is provided therebetween. In this embodiment, the tapered region 60e has such a shape as to gradually decrease in the diameter from a portion connecting to the first straight region 60d to a portion connecting to the second straight region 60f. It should be noted that the tapered region 60e constitutes a portion to abut against the sector gear 41a as described below.

The tip portion 60C is formed in an approximately cylindrical shape, and is connected to the second straight region 60f of the main body portion 60B. In this embodiment, a step portion 60g is provided in the connection portion of the tip portion 60C to the second straight region 60f, and the diameter of the tip portion 60C is less than the diameter of the second straight region 60f.

A description is now given of an attachment structure of the restriction member 60 based on FIG. 19 and FIG. 20. The restriction member 60 is inserted via through holes respectively provided in the support bracket 63, the sector gear 41a, and the cushion side frame 21L in this sequence starting from the seat inside as shown in FIG. 19 and FIG. 20. Then, the tip portion 60C of the restriction member 60 is fixed to a case member 65 by means of welding via a welding bead 64. Moreover, the head portion 60A of the restriction member 60 is fixed to the support bracket 63 by means of welding via a welding bead 62.

As shown in FIG. 19, FIG. 20, and FIG. 23, the restriction member 60 is inserted through a through hole 41h of the sector gear 41a, and the movement of the sector gear 41a is restricted by abutment between a wall portion 41h1 of the through hole 41h and the tapered region 60e of the restriction member 60.

A description is now given of an effect of decreasing noise by the restriction member 60 based on FIG. 23 and FIG. 25. An abutment portion 80 between the restriction member 60 on which the taper is formed and the sector gear 41a is schematically shown in FIG. 23. Moreover, the abutment portion 80 between the restriction member 60P on which the taper is not formed and the sector gear 41a is schematically shown as a comparative example in FIG. 25.

First, a surface of the sector gear 41a opposing the restriction member 60P abuts against an entire width of the restriction member 60P in the seat widthwise direction between the restriction member 60P and the sector gear 41a as shown in FIG. 25. Therefore, when a torsional force is applied to the sector gear 41a, a beveled surface is not provided in the abutment portion between the sector gear 41a and the restriction member 60P, and a contact between the sector gear 41a and the restriction member 60P deformed by the torsional force thus likely generates noise.

In contrast, forming a portion of the restriction member 60 abutting against the sector gear 41a into the tapered shape as shown in FIG. 23 results in abutment of a part of the sector gear 41a in the seat widthwise direction out of the surface opposing the restriction member 60 against the restriction member 60. In other words, a beveled surface can be provided in the portion at which the sector gear 41a and the restriction member 60 abut against each other by providing the tapered region 60e on the restriction member 60. Therefore, the generation of the noise can be suppressed when the sector gear 41a rotates based on the height adjustment operation.

It should be noted that though the restriction member 60 is fixed to the case member 65 by means of the welding in the above-described attachment structure of the restriction member 60, the attachment structure is not limited to this case.

For example, a thread may be formed on the tip portion 60C of the restriction member 60-1 as shown in FIG. 21B. The restriction member 60-1 is the same in the construction as the restriction member 60 except for the tip portion 60C, and a description of other portions is thus not given. Then, a nut 70 having a threaded engagement with the tip portion 60C of the restriction member 60-1 is used to fix the restriction member 60-1 to the sector gear 41a as shown in FIG. 22. Specifically, the nut 70 is arranged so that the cushion side frame 21L and the case member 65 are sandwiched between the step portion 60g of the restriction member 60-1 and the nut 70 as shown in FIG. 22. Then, the restriction member 60-1 may be fixed to the sector gear 41a or the like by tightening the nut 70.

Variation

Moreover, though the portion of the restriction member 60 abutting against the sector gear 41a is formed into the tapered shape according to the embodiment, a taper may be provided on the sector gear side. The abutment portion 80 between a sector gear 41X on which the taper is formed and a restriction member 60P is schematically shown in FIG. 24.

A beveled surface can be provided at a portion at which the sector gear 41X and the restriction member 60P abut against each other by providing a tapered region 41e abutting against the restriction member 60P on the sector gear 41X as shown in FIG. 24. Therefore, the generation of the noise can be suppressed when the sector gear 41X rotates based on the height adjustment operation.

It should be noted that the described embodiments are simply examples for promoting understanding of the present disclosure, and does not limit the present disclosure. It should be understood that the present disclosure can be changed and improved without departing from the gist thereof, and the present disclosure includes equivalences thereof.

For example, the first straight region 60d and the second straight region 60f are provided in addition to the tapered region 60e on the main body portion 60B of the restriction member 60 (restriction member 60-1) according to the embodiment. However, the construction is not limited to this example, and only the tapered region 60e may be provided, or any one of the first straight region 60d and the second straight region 60f may be omitted according to the embodiment.

What is claimed is:

1. A seat frame for a vehicle seat comprising:
   a seat cushion frame that forms a frame for a seating portion of the vehicle seat; and
   a height adjustment mechanism that is coupled to the seat cushion frame and a rail mechanism of the vehicle seat, wherein the height adjustment mechanism adjusts a height of the seat cushion frame, wherein:
   the height adjustment mechanism comprises:
      a sector gear that rotates based on a height adjustment operation,
      a link that moves the height of the seat cushion frame up and down based on a rotation of the sector gear, and a restriction member that abuts against the sector gear, thereby restricting a movement of the sector gear;

the sector gear comprises a through hole through which the restriction member is inserted;

the restriction member comprises a main body portion that abuts against a wall portion of the through hole to restrict the movement of the sector gear; and the main body portion comprises a tapered region that has a tapered shape and that penetrates through the through hole.

2. The seat frame according to claim 1, wherein the restriction member is a pin which is a cylinder inserted through the through hole of the sector gear.

3. The seat frame according to claim 2, wherein the restriction member comprises the tapered region and a straight region that is constant in a cross sectional shape.

4. The seat frame according to claim 1, wherein the restriction member comprises the tapered region and a straight region that is constant in a cross sectional shape.

5. The seat frame according to claim 4, wherein:
the restriction member comprises:
a tip portion that engages with the seat cushion frame; and
the tip portion and the main body portion are connected with each other via a step structure.

6. The seat frame according to claim 5, wherein:
the main body portion comprises the tapered region and the straight region; and
the straight region is provided between the tapered region and the tip portion.

7. The seat frame according to claim 6, wherein:
a thread is formed on the tip portion; and
the tapered region is larger in a diameter than the tip portion.

8. The seat frame according to claim 5, wherein:
a thread is formed on the tip portion; and
the tapered region is larger in a diameter than the tip portion.

9. A seat frame for a vehicle seat comprising:
a seat cushion frame that forms a frame for a seating portion of the vehicle seat; and
a height adjustment mechanism that is coupled to the seat cushion frame and a rail mechanism of the vehicle seat, wherein the height adjustment mechanism adjusts a height of the seat cushion frame;
wherein:
the height adjustment mechanism comprises:
a sector gear configured to rotate based on a height adjustment operation,
a link configured to move the height of the seat cushion frame up and down based on a rotation of the sector gear, and
a restriction member that abuts the sector gear to restrict movement of the sector gear;
the sector gear comprises a through hole through which the restriction member is inserted;
the through hole comprises a wall portion that abuts the restriction member; and
the wall portion has a tapered shape.

* * * * *